US012283763B1

(12) United States Patent
Cheng

(10) Patent No.: US 12,283,763 B1

(45) Date of Patent: Apr. 22, 2025

(54) WIDEBAND MILLIMETER-WAVE MICROSTRIP ANTENNA HAVING IMPEDANCE STABILIZING ELEMENTS AND ANTENNA ARRAY EMPLOYING SAME

(71) Applicant: Ainstein AI, Inc., Lawrence, KS (US)

(72) Inventor: Guang-Fu Cheng, Irvine, CA (US)

(73) Assignee: Ainstein AI, Inc., Lawrence, KS (US)

( * ) Notice: Subject to any disclaimer, the term of this patent is extended or adjusted under 35 U.S.C. 154(b) by 0 days.

(21) Appl. No.: 18/146,248

(22) Filed: Dec. 23, 2022

Related U.S. Application Data

(63) Continuation of application No. 17/085,477, filed on Oct. 30, 2020, now Pat. No. 11,539,139.

(60) Provisional application No. 62/928,053, filed on Oct. 30, 2019.

(51) Int. Cl.

| | |
|---|---|
| ***H01Q 9/04*** | (2006.01) |
| ***H01P 3/00*** | (2006.01) |
| ***H01Q 21/00*** | (2006.01) |
| ***H01Q 21/08*** | (2006.01) |

(52) U.S. Cl.
CPC ............ *H01Q 9/045* (2013.01); *H01P 3/006* (2013.01); *H01Q 21/0037* (2013.01); *H01Q 21/08* (2013.01)

(58) Field of Classification Search
CPC ...... H01P 3/006; H01Q 9/0045; H01Q 21/08; H01Q 21/0037
See application file for complete search history.

(56) References Cited

U.S. PATENT DOCUMENTS

| | | | |
|---|---|---|---|
| 11,539,139 B1 | 12/2022 | Cheng | |
| 2015/0091760 A1 | 4/2015 | Sawa | |
| 2018/0115056 A1* | 4/2018 | Rashidian | H01Q 5/385 |
| 2019/0245276 A1* | 8/2019 | Li | H01Q 13/206 |

* cited by examiner

*Primary Examiner* — Hoang V Nguyen
*Assistant Examiner* — Amal Patel
(74) *Attorney, Agent, or Firm* — AVEK IP, LLC

(57) ABSTRACT

Wideband millimeter-wave microstrip antenna having impedance stabilizing elements, and antenna array including same. The antenna includes a main patch and two impedance stabilizing elements each located at a distance from the main patch. One of the two impedance stabilizing elements is disposed at a first side of the main patch and the other of the two impedance stabilizing elements is disposed at a second side of the main patch opposing the first side. A maximum width of each of the two impedance stabilizing elements is less than half of a maximum width of the main patch. The main patch includes at least one feed line and a row of via that extends along one side of the main patch.

20 Claims, 15 Drawing Sheets

WIDEBAND MILLIMETER-WAVE MICROSTRIP ANTENNA HAVING IMPEDANCE STABILIZING ELEMENTS AND ANTENNA ARRAY EMPLOYING SAME

CROSS REFERENCE TO RELATED APPLICATIONS

The application is a continuation of U.S. application Ser. No. 17/085,477, filed Oct. 30, 2020, which claims priority to U.S. Provisional Patent Application No. 62/928,053 titled "Microstrip Millimeter Wave Antenna Array," filed Oct. 30, 2019, the disclosure of which is incorporated by reference herein in its entirety.

FIELD OF THE DISCLOSURE

The disclosure relates generally to the field of millimeter-wave microstrip antennas. More specifically, the disclosure relates to millimeter-wave microstrip antennas having impedance stabilizing elements that allow the antennas to be operated at a wide range of frequencies, and to antenna arrays employing these wideband antennas.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, an antenna array comprises a plurality of independently fed components. Each of the plurality of independently fed components comprises a millimeter-wave wideband patch antenna. Each millimeter-wave wideband patch antenna includes a main patch and two rectangular impedance stabilizing elements. Each of the two rectangular impedance stabilizing elements are symmetrically disposed at a coupling distance from the main patch and extend parallel to the main patch. One of the two rectangular impedance stabilizing elements is disposed on one side of the main patch and the other of the two rectangular impedance stabilizing elements is disposed on an opposing side of the main patch. A length of each of the two rectangular impedance stabilizing elements is equal to a length of the main patch. A width of each of the two rectangular impedance stabilizing elements is less than half of a width of the main patch. A bandwidth of each millimeter-wave wideband patch antenna is greater than 3.5 GHz.

In some aspects, an antenna array comprising a plurality of independently fed components is disposed on a printed circuit board. Each of the plurality of independently fed components includes a millimeter-wave wideband patch antenna. Each millimeter-wave wideband patch antenna has a main patch and two rectangular impedance stabilizing elements. Each of the two rectangular impedance stabilizing elements is symmetrically disposed at a coupling distance from the main patch and extends parallel to the main patch. One of the two rectangular impedance stabilizing elements is disposed on one side of the main patch and the other of the two rectangular impedance stabilizing elements is disposed on an opposing side of the main patch. A width of each of the two rectangular impedance stabilizing elements is less than half of a width of the main patch.

In some aspects, an antenna array comprises at least one antenna assembly. The at least one antenna assembly has a plurality of antennas coupled in series and includes a solitary millimeter-wave wideband patch antenna as a terminal antenna in the series. The millimeter-wave wideband patch antenna comprises a main patch and two rectangular impedance stabilizing elements. The two rectangular impedance stabilizing elements are symmetrically disposed at a coupling distance from the main patch and extend parallel to the main patch. One of the two rectangular impedance stabilizing elements is disposed on one side of the main patch and the other of the two rectangular impedance stabilizing elements is disposed on an opposing side of the main patch. A width of each of the two rectangular impedance stabilizing elements is less than half of a width of the main patch.

In some aspects, the techniques described herein relate to a millimeter-wave wideband patch antenna. The antenna includes a rectangular main patch and two rectangular impedance stabilizing elements each located at a distance from the main patch. One of the two rectangular impedance stabilizing elements is disposed at a first side of the main patch and the other of the two rectangular impedance stabilizing elements is disposed at a second side of the main patch opposing the first side. A length of each of the two rectangular impedance stabilizing elements is equal to a length of the main patch, and a width of each of the two rectangular impedance stabilizing elements is less than half of a width of the main patch. The main patch includes a plurality of feed lines. Each of the plurality of feed lines extends from at least one of a third side of the main patch and a fourth side of the main patch opposing the third side. A row of via on the main patch extends parallel to at least one of the first side and the second side.

In some aspects, the techniques described herein relate to a millimeter-wave wideband patch antenna, wherein the plurality of feed lines includes at least one feed line extending from the third side of the main patch and at least one feed line extending from the fourth side of the main patch.

In some aspects, the techniques described herein relate to a millimeter-wave wideband patch antenna, wherein the plurality of feed lines includes at least two feed lines each extending from the third side of the main patch.

In some aspects, the techniques described herein relate to a millimeter-wave wideband patch antenna, wherein at least one of the plurality of feed lines includes a slot in the main patch on both sides of the at least one feed line.

In some aspects, the techniques described herein relate to a millimeter-wave wideband patch antenna, configured in an array of antennas.

In some aspects, the techniques described herein relate to a millimeter-wave wideband patch antenna, wherein the millimeter-wave wideband patch antenna is a terminal portion of the array of antennas.

In some aspects, the techniques described herein relate to a millimeter-wave wideband patch antenna, wherein at least a portion of the antenna is formed on a multilayered substrate.

In some aspects, the techniques described herein relate to a millimeter-wave wideband patch antenna, wherein the row of via divides the main patch into two segments.

In some aspects, the techniques described herein relate to a millimeter-wave wideband patch antenna, wherein the two segments are equal in size.

In some aspects, the techniques described herein relate to a millimeter-wave wideband patch antenna, wherein the distance is about 0.1 mm.

In some aspects, the techniques described herein relate to a millimeter-wave wideband patch antenna, wherein the distance is about 0.05 mm.

In some aspects, the techniques described herein relate to a millimeter-wave wideband patch antenna. The antenna includes a rectangular main patch and two rectangular impedance stabilizing elements each located at a distance from the main patch. One of the two rectangular impedance stabilizing elements is disposed at a first side of the main patch and the other of the two rectangular impedance stabilizing elements is disposed at a second side of the main patch opposing the first side. A length of each of the two rectangular impedance stabilizing elements is equal to a length of the main patch, and a width of each of the two rectangular impedance stabilizing elements is less than half of a width of the main patch. The main patch includes at least one feed line extending from at least one of a third side and a fourth side of the main patch. A row of via extends parallel to one of the first side and the second side.

In some aspects, the techniques described herein relate to a millimeter-wave wideband patch antenna, wherein the feed lines includes a plurality of feed lines that includes at least one feed line extending from the third side of the main patch and at least one feed line extending from the fourth side of the main patch.

In some aspects, the techniques described herein relate to a millimeter-wave wideband patch antenna, wherein the main patch includes two slots, one of the two slots on one side of the at least one feed line and the other of the two slots on the other side of the main patch.

In some aspects, the techniques described herein relate to a millimeter-wave wideband patch antenna, wherein the row of via divides the main patch into two equal segments.

In some aspects, the techniques described herein relate to a millimeter-wave wideband patch antenna, wherein the millimeter-wave wideband patch antenna is a part of an antenna array.

In some aspects, the techniques described herein relate to a millimeter-wave wideband patch antenna, wherein the millimeter-wave wideband patch antenna is a terminal part of the antenna array.

In some aspects, the techniques described herein relate to a millimeter-wave wideband patch antenna. The antenna includes a main patch and two impedance stabilizing elements each located at a distance from the main patch. One of the two impedance stabilizing elements is disposed at a first side of the main patch and the other of the two impedance stabilizing elements is disposed at a second side of the main patch opposing the first side. A maximum width of each of the two impedance stabilizing elements is less than half of a maximum width of the main patch. The main patch includes at least one feed line and a row of via that extends along one side of the main patch.

In some aspects, the techniques described herein relate to a millimeter-wave wideband patch antenna, wherein the millimeter-wave wideband patch antenna is a terminal portion of an antenna array.

In some aspects, the techniques described herein relate to a millimeter-wave wideband patch antenna, wherein the main patch includes two slots, one at a first side of the at least one feed line and the other at an opposing side of the at least one feed line.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1A:
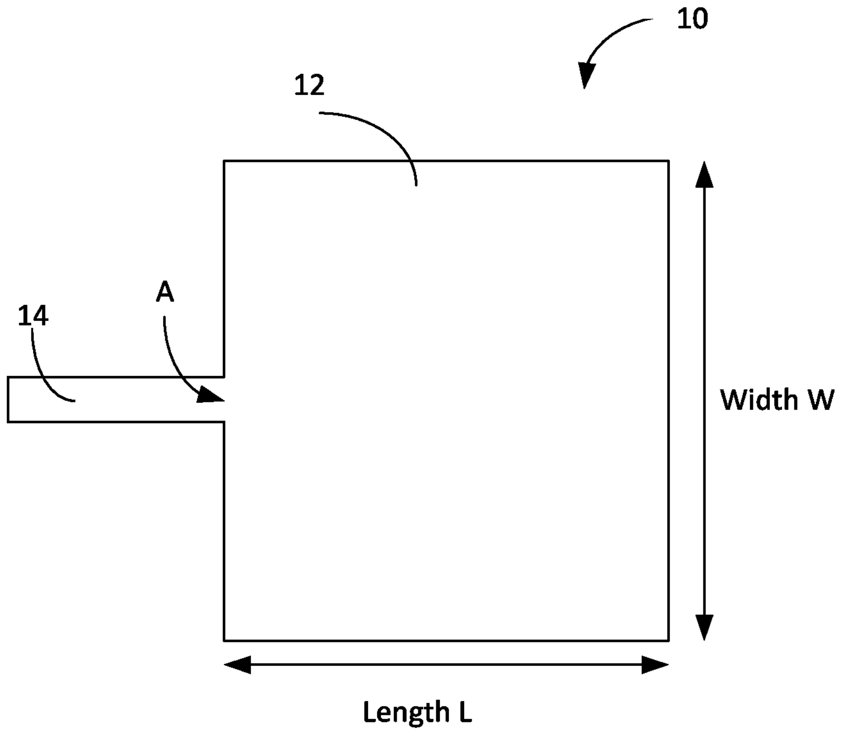
FIG. 1A (Prior Art)
FIG. 1A is a top view of a PRIOR ART millimeter-wave microstrip patch antenna.

Microstrip (or "microstrip patch" or "patch") antennas are becoming increasingly useful because they have a low cost of fabrication, a relatively low profile, and importantly, because they can be printed directly onto a circuit board. Patch antennas also have shortcomings, however, chief among which is their extremely narrow bandwidth.

The artisan understands that in high frequency applications, impedance matching is critical to optimizing performance of the microstrip antenna. The goal is to match the impedance of the feed line to the impedance of the microstrip antenna. Because the impedance of an antenna changes with frequency, there is a limited frequency range within which the input impedance can be matched to the antenna impedance. Antenna bandwidth is a measure of this frequency range. The impedance of the antenna results from several factors including the size and shape of the antenna, the frequency of operation, and its environment.

The antenna impedance is normally complex, i.e. consists of resistive elements as well as reactive ones. The resistive elements of the impedance comprise loss resistance (i.e., actual resistance of the elements and the power dissipated thereby via heat) and radiation resistance (i.e., virtual resistance arising from the dissipation of power when it is radiated from the antenna). The reactive elements of the impedance arise from the fact that the antenna elements act as tuned circuits that possess inductance and capacitance. At resonance, the inductance and capacitance cancel one another out to leave only the resistance (i.e., the combined radiation resistance and loss resistance). However, on either side of resonance, the feed impedance quickly becomes either inductive (if operated above the resonant frequency) or capacitive (if operated below the resonant frequency). Energy transfer via the microstrip antenna is maximized by matching the impedance of the antenna with the impedance of the feed line.

The operational frequency range or bandwidth is a key characteristic of any antenna. A wideband antenna is one with approximately the same operating characteristics over a wide passband. Wideband antennas are distinguishable from broadband antennas, where the passband is large, but the antenna gain and/or radiation pattern does not stay the same over the passband. Narrowband antennas exhibit the same or approximately the same operating characteristics over a narrow passband. The prior art millimeter-wave microstrip patch antennas generally fall into this last category. The term narrowband, as used herein, connotes a millimeter-wave bandwidth of under 1.5 GHz. The term wideband, as used herein, connotes a millimeter-wave bandwidth of over 3.5 GHz.

Typically, the target value of antenna impedance is 50 Ohms. At EHF (i.e., extremely high frequency, from 30 GHz to 300 GHz, also known as the millimeter-wave frequency band or the millimeter band), the bandwidth of the prior art microstrip antennas is generally limited to about 1.5 GHz. This means that in the millimeter-wave frequency band the input impedance of the prior art antennas is stable at or around 50 Ohms for this very narrow band (e.g., 0.5-1.5 GHz). Efforts have been made in the prior art to increase the bandwidth of patch antennas, e.g., by increasing the width of the patch, using proximity or aperture coupling, by making the substrate electrically thicker, et cetera. These techniques, while useful in increasing the bandwidth of the patch antenna, also have drawbacks. For example, increasing the width of the patch to increase bandwidth may undesirably increase the size of the antenna and cause the antenna to take up more of the valuable real estate on the circuit board.

The present disclosure pertains to a millimeter wave patch antennas having impedance stabilizing elements that serve to stabilize the impedance of the patch antenna at the target impedance (e.g., 50 Ohms) for a wider frequency range (e.g., 1-4 GHz), and resultantly, enable the patch antenna to operate over wider bandwidths (e.g., from 60 to 64 GHz). The disclosed EHF wideband patch antennas and antennas arrays may be used in a wide variety of applications, such as in altimeters, automotive sensors, mobile devices, wearable devices, frequency-modulated continuous-wave radars, multiple-input multiple-output radars, et cetera.

Figure 1B:
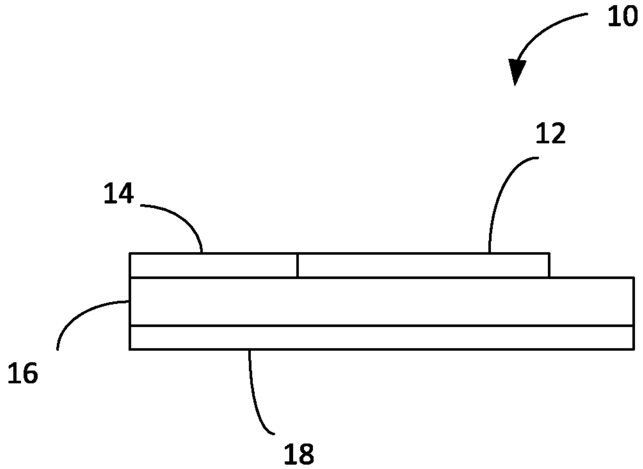
FIG. 1B (Prior Art)
FIG. 1B is a cross-section side view of the PRIOR ART millimeter-wave microstrip patch antenna of FIG. 1A.

FIGS. 1A-1B show an EHF microstrip patch antenna 10 as is known in the prior art. The patch antenna 10 comprises a rectangular patch 12 having a length L and a width W. Signal is fed to the antenna 10 at location A via a microstrip transmission line 14. The antenna 10 and the microstrip transmission line 14 sit atop a substrate (i.e., a dielectric circuit board) 16. As shown in FIG. 1B, a ground 18 may also be provided. The patch 12, the transmission line 14, and the ground 18 are typically made of high conductivity metal (e.g., copper). The substrate, and the dielectric constant thereof, may be chosen to operate the patch antenna 10 at a desired frequency.

Figure 1C:
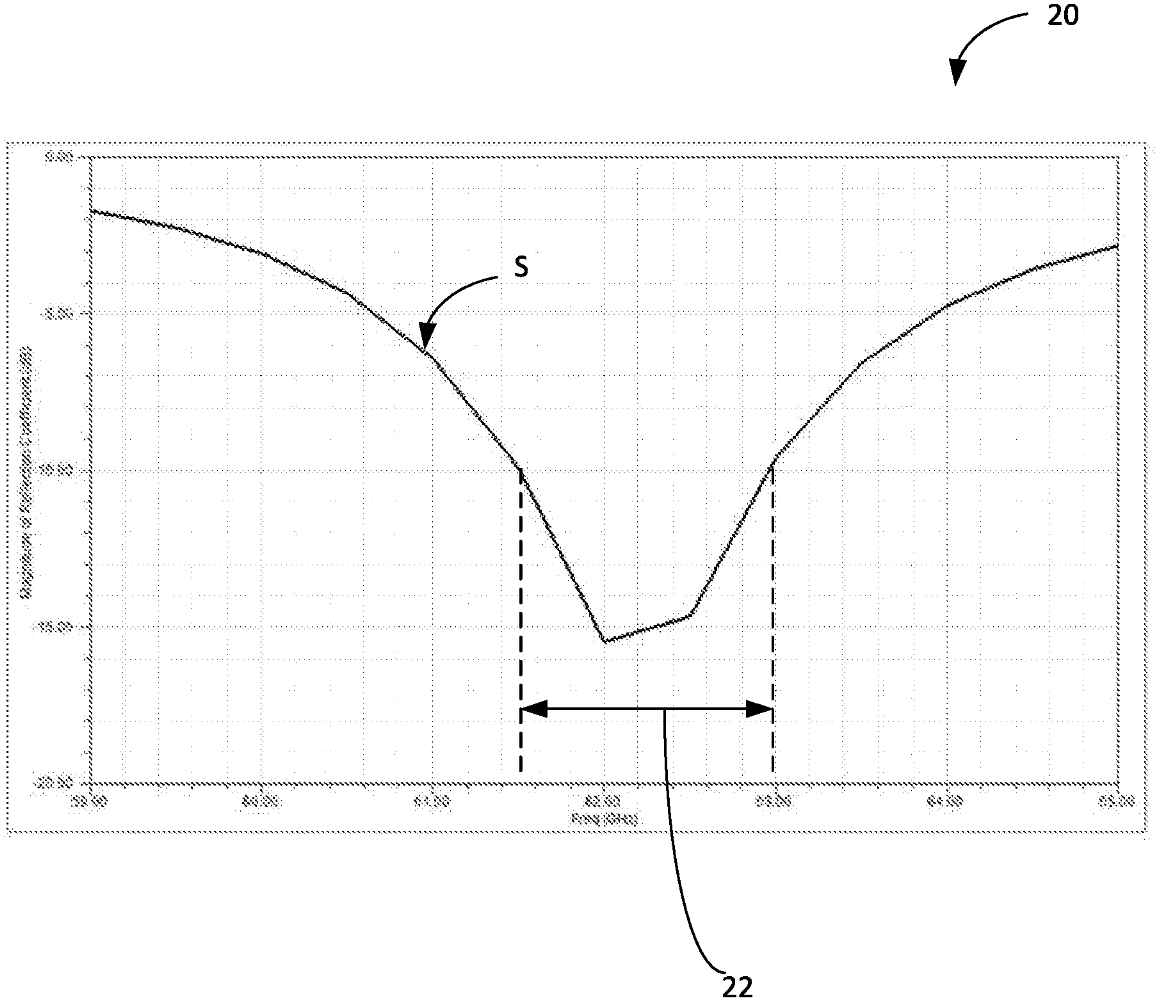
FIG. 1C (Prior Art)
FIG. 1C is a simulation plot illustrating a magnitude of reflection coefficient of the PRIOR ART antenna of FIGS. 1A-1B.

The frequency of operation of the patch antenna 10 is determined by its length L. The width W of the microstrip antenna controls the input impedance, and resultantly, impacts bandwidth. Bandwidth of an antenna can be illustrated in a variety of ways, such as using a return loss plot, Smith Charts, Voltage Standing Wave Ratio measurements, et cetera. FIG. 1C is a simulation plot 20 the return loss S of the prior art antenna 10 of FIGS. 1A-1B. The return loss S is the magnitude of the reflection coefficient, which depends on the impedance of the antenna 10. As can be seen, the prior art EHF antenna 10 of FIGS. 1A-1B has a 10 dB return loss bandwidth 22 of about 1.5 GHz. That is, the return loss S of the antenna 10 is within acceptable limits from 61.5 GHz to 63 GHz, but outside of this range, majority of the power is undesirably reflected instead of being transmitted from or received by the antenna 10. Thus, the impedance is stable at or around 50 Ohms only within this narrow frequency band of 1.5 GHz.

As noted, one way to control the impedance of the antenna is to vary the width W. For example, the width W may be increased to decrease the input impedance. Increasing the width may not always be feasible, however, particularly where space on the board is limited.

Another way to vary the input impedance of a patch antenna, such as the antenna 10, is to modify the feed. Since the current is low at the ends of a half-wave patch and increases in magnitude toward the center of the patch 12, the input impedance (Z=V/I) may be altered if the patch 12 is fed closer to the center. For example, as shown in FIG. 1D, one method of feeding the patch 12 closer to the center is by using an inset feed (i.e., feeding the antenna at a distance R from the end).

Figure 1D:
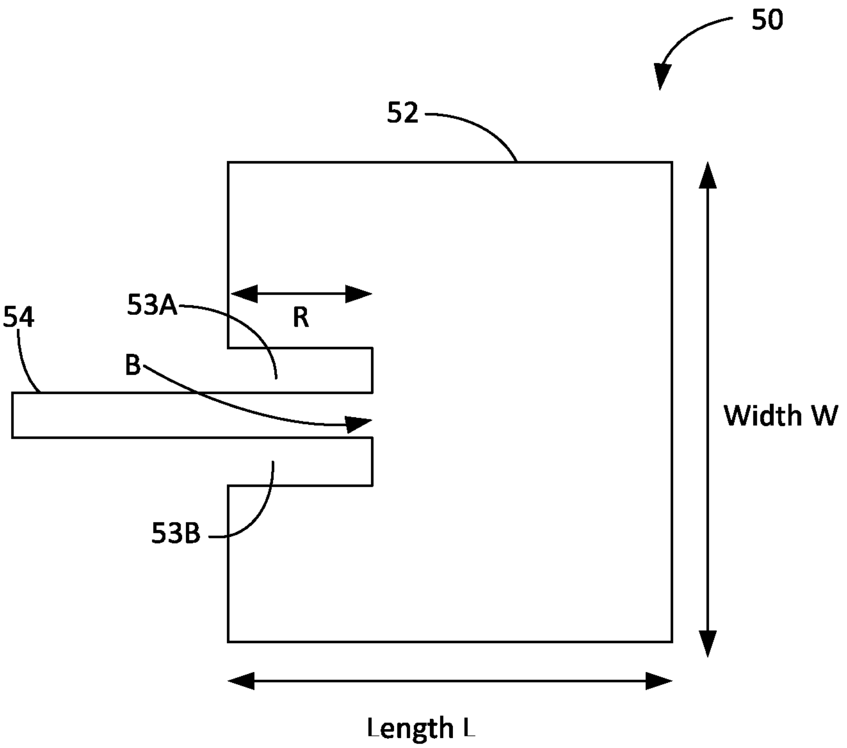
FIG. 1D (Prior Art)
FIG. 1D is a top view of another PRIOR ART microstrip patch antenna.

Specifically, FIG. 1D shows a prior art antenna 50 having a patch 52 and a microstrip transmission line 54. The patch 52 of the antenna 50 has slots (or openings) 53A and 53B, and the antenna 50 is fed at a location B that is inset a distance R from location A of the antenna 10 in FIGS. 1A-1B along the length L of the antenna. Since the current has a sinusoidal distribution, if the length L is half the wavelength, moving in a distance R from the end will increase the current I by: cos ($\pi$*R/L). The increase in current will result in a corresponding decrease in voltage V, and the impedance will scale as a function of the inset. Thus, moving in a distance R may serve to alter the input impedance. R may be increased such that it approaches L/2, and may be selected so as to improve the input impedance for the desired frequency band. However, it is typically not possible to stabilize the input impedance to 50 Ohms for a wide frequency band using inset feeding alone. The present disclosure relates to EHF antennas and antenna arrays that include impedance stabilizing elements which enable the antenna and antenna arrays to have a stable impedance (e.g., 50 Ohms) over a wider frequency band as compared to the rectangular or slotted patch antennas of the prior art.

Figure 2A:
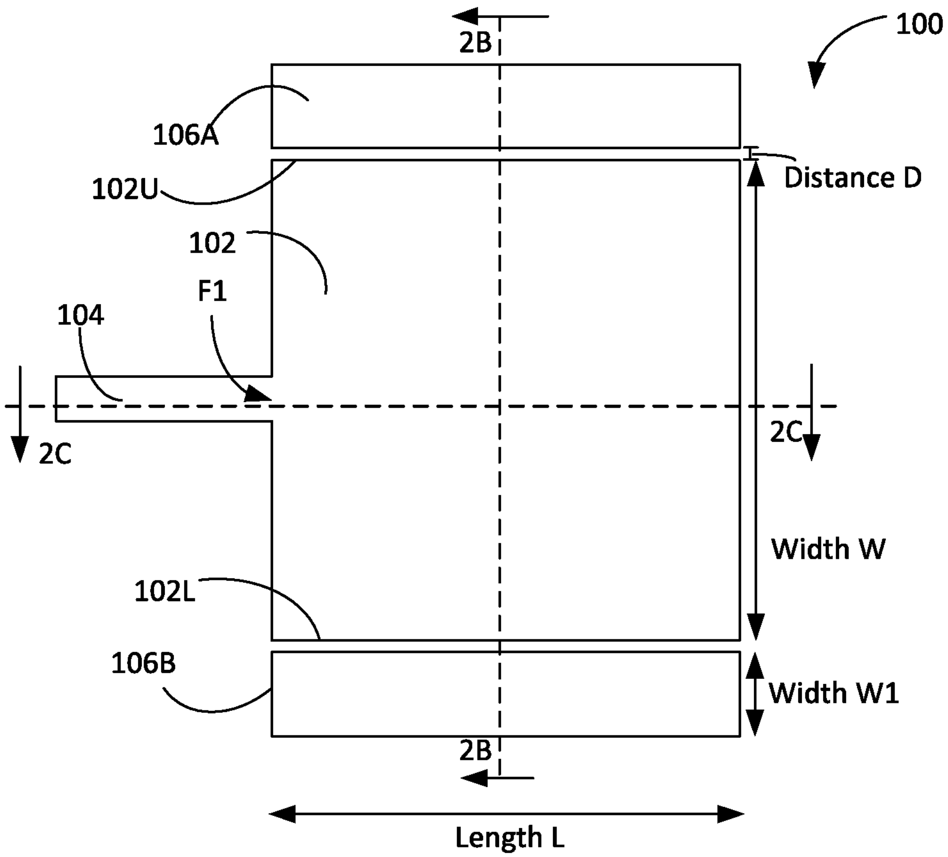
FIG. 2A is a top view of a wideband millimeter-wave microstrip patch antenna having impedance stabilizing elements, according to an embodiment.
Figure 2B:
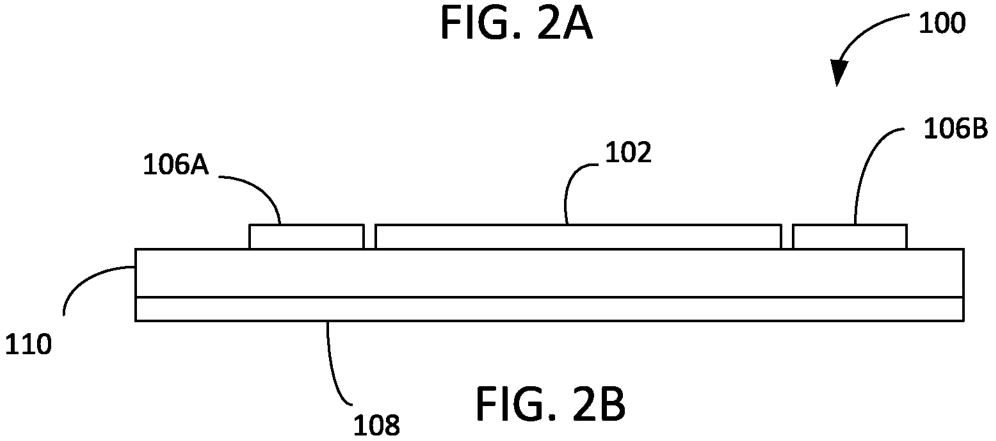
FIGS. 2B and 2C are cross-section side views of the wideband millimeter-wave microstrip patch antenna of FIG. 2A.
Figure 2C:
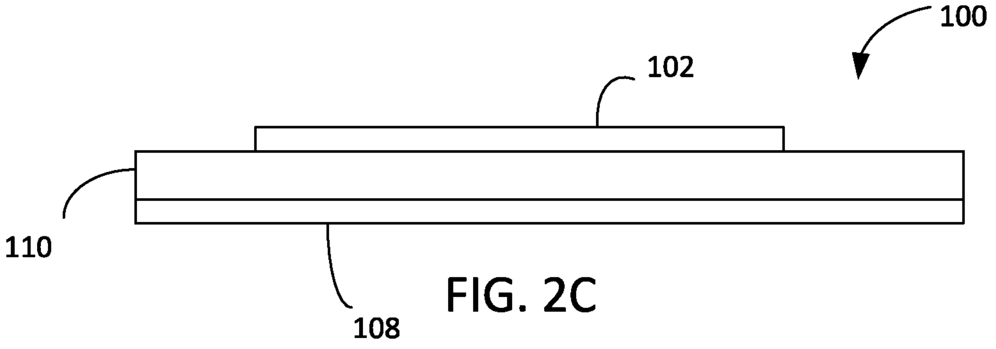

FIGS. 2A-2C show a wideband millimeter-wave microstrip patch antenna 100, according to an embodiment of the present disclosure. The millimeter wave antenna 100 may have a main microstrip patch 102 having a length L and a width W. In this embodiment, the antenna 100 may be fed at location F1 via a microstrip feed line 104.

The antenna 100 may comprise two rectangular impedance stabilizing (or control) elements 106A and 106B that are symmetrically arranged outwardly adjacent the main patch 102. Each impedance stabilizing element 106A and 106B may extend laterally generally parallel to an upper edge 102U and a lower edge 102L of the patch 102. Specifically, impedance stabilizing element 106A may be disposed lengthwise atop the patch 102 at a distance D from the upper edge 102U of the patch 102, and the impedance stabilizing element 106B may be disposed lengthwise below the patch 102 at the same distance D from a lower edge 102L of the patch 102. As can be seen, the patch 102 may not contact either impedance stabilizing elements 106A and 106B. That is, the impedance stabilizing elements 106A and 106B may not be physically connected to the patch 102 and may therefore be parasitic. The artisan will understand that terms such as "upper" and "lower" are merely intended to illustrate the location of the impedance stabilizing elements 106A and 106B relative to the main patch 102 as oriented in FIG. 2A, and that the main patch 102 may be oriented in other ways (e.g., may be disposed on a board such that the impedance stabilizing elements 106A and 106B are to the left and the right of the main patch 102).

In embodiments, the impedance stabilizing elements 106A and 106B may have the same dimensions, i.e., each may have a length L and a width W1. As illustrated in FIG. 2A, the length L of each impedance stabilizing element 106A and 106B may be the same as the length L of the patch 102, but the width W1 of each impedance stabilizing element 106A and 106B may be substantially less than the width W of the patch 102. In embodiments, the width W1 of each impedance stabilizing element 106A and 106B may be between $\frac{1}{3}^{rd}$ and $\frac{1}{4}^{th}$ of the width W of the main patch 102.

In other embodiments, a length of the impedance stabilizing elements may be less than or greater than the length L of the patch 102. In other embodiments still, the two impedance stabilizing elements 106A and 106B may be disparately sized.

The patch 102 and the impedance stabilizing elements 106A and 106B may be disposed above the substrate 110 (FIGS. 2B-2C). The substrate 110, and the dielectric constant thereof, may be chosen to operate the patch antenna 100 at a desired frequency. A ground 108 may also be provided on the surface of the substrate 110 opposing the surface on which the patch 102 and the impedance stabilizing elements 106A and 106B are disposed.

The patch 102, the transmission line 104, and the ground 108 (FIG. 2B) may be made of high conductivity metal (e.g., copper). Each impedance stabilizing element 106A, 106B may likewise be made of metal, and may comprise the same metal(s) used to form the patch 102 and/or the transmission line 104. Because the impedance stabilizing elements 106A and 106B are made of metal, they may be capable of transmitting and/or receiving energy. Particularly where the distance D is small, the impedance stabilizing elements 106A and 106B may to some degree transmit and/or receive the energy being transmitted and/or received by the main patch 102.

The distance D may be selected so as to allow for optimal coupling of the energy from the main radiator 102 to the impedance stabilizing elements 106A and 106B at the operating frequency of the antenna 100 to thereby enable the input impedance of the antenna 100 to be stabilized over a wider frequency band. If D is too large, the impedance stabilizing elements 106A and 106B may not appreciably alter the impedance of the antenna 100 and the antenna 100 may essentially function as if the impedance stabilizing elements 106A and 106B were not present. If D is zero or approaches zero, the antenna 100 may operate as if the impedance stabilizing elements 106A and 106B were integral to the patch 102, i.e., the antenna 100 may simply operate as a larger antenna. By optimizing the value of D, signal coupling between the main patch 102 and the parasitic elements 106A and 106B is also optimized such that either extreme is avoided and the impedance stabilizing elements 106A and 106B function primarily to stabilize the bandwidth of the antenna 100 over a wider frequency band. In embodiments, the distance D may be about 0.1 mm, i.e., may be between 0.05 mm and 0.5 mm. The distance D may also be referred to herein as a "coupling distance." At this distance D, the impedance stabilizing elements 106A and 106B may only transmit and/or receive a minimal amount of energy being transmitted and/or received by the patch 102, and the impedance stabilizing elements 106A and 106B may function primarily to stabilize the impedance of the antenna 100 over a wider frequency range.

In the embodiment illustrated in FIGS. 2A-2C, the antenna 100 may include two layers of metal and one substrate 110. One layer of metal forms the parasitic elements 106A and 106B and the main patch 102 that is connected to the signal, and the other layer of metal forms the ground 108. In some embodiments, the substrate 110 may be one layer of uniform material chosen to have low loss characteristics at the operational frequency. Alternately, a plurality of layers comprised of different materials with different dielectric constants, or non-uniform dielectric constant substrates, may form the substrate 110. Where the substrate 110 comprises more than one layer, the width of the layers may be uniform or disparate, as discussed below. Further, as also discussed below, the main patch 102 and the impedance control elements 106A and 106B may be disposed on different layers of the multi-layered substrate. In some embodiments, the ground 108 may likewise be formed of a plurality of layers.

Figure 3:
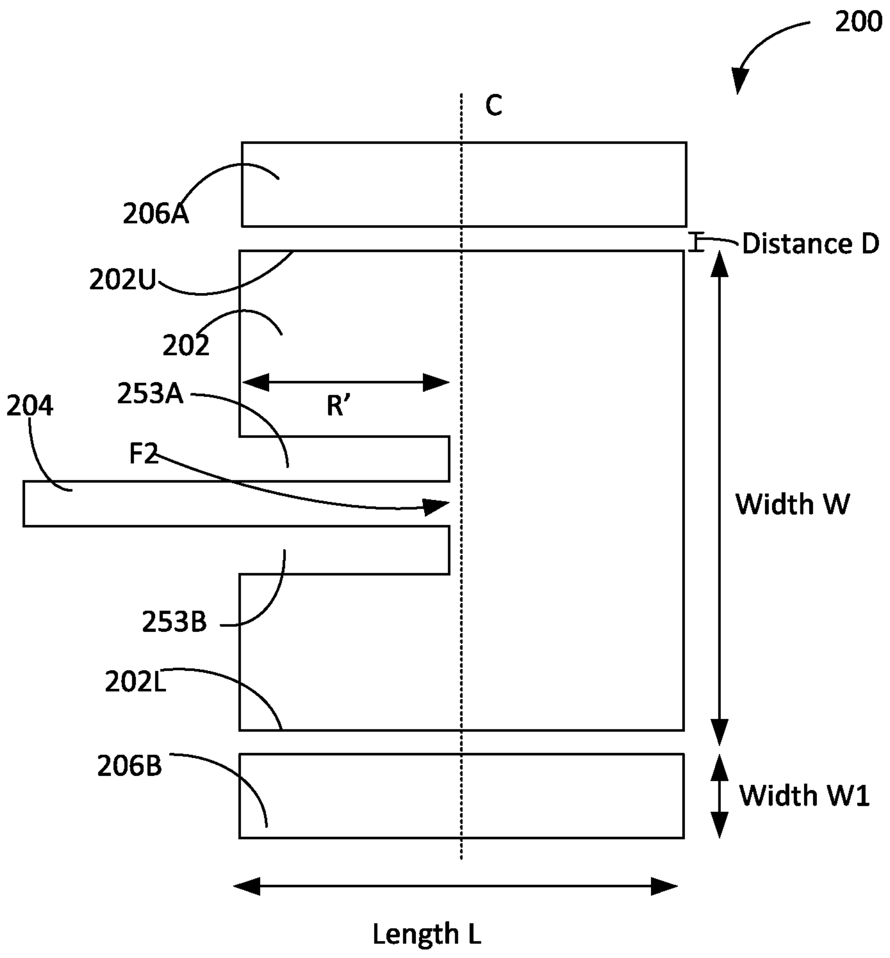
FIG. 3 is a top view of another wideband millimeter-wave microstrip patch antenna having impedance stabilizing elements, in an embodiment.

FIG. 3 shows an alternate embodiment 200 of the antenna 100. Embodiment 200 is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference number 200 to 299 may be used to indicate elements corresponding to those discussed above numbered from 100 to 199, though with any noted, shown, or inherent deviations.

The antenna 200, like the antenna 100, comprises a main patch 202, a microstrip transmission feed line 204, and impedance stabilizing elements 206A and 206B. The main patch 202 has a length L and a width W. Impedance stabilizing element 206A extends laterally and is upwardly adjacent the upper edge 202U of the patch 202, and impedance stabilizing element 206B extends laterally and is downwardly adjacent the lower edge 202L of the patch 202. Specifically, impedance stabilizing element 206A is disposed at a distance D from the upper edge 202U and impedance stabilizing element 206B is disposed at the distance D from the lower edge 202L. As discussed with respect to the antenna 100, the distance D may be selected so as to optimize the impedance stabilizing function of the impedance stabilizing elements 206A and 206B. In an embodiment, D may be about 0.1 mm.

As in the illustrated antenna 100, the length of the impedance stabilizing elements 206A and 206B may be the same and may be equal to the length L of the main patch 202. The width W1 of each of impedance matching element 206A, 206B may be the same, and may be between $1/3^{rd}$ and $1/4^{th}$ of the width W of the main patch 202. While FIG. 3 illustrates that the impedance matching elements 206A, 206B are of the same size, as discussed with respect to antenna 100, the impedance matching elements 206A, 206B may be disparately sized and may be disposed on different layers of a multi-layered substrate. The ground may likewise be formed of one layer of metal or may be multi-layered.

Thus, the antenna 200 may be substantially the same as antenna 100, except for slots 253A and 253B. That is, a primary difference between the antenna 100 and the antenna 200 may be that the antenna patch 202 may have slots (or openings) 253A and 253B, and the antenna 200 may be fed at a location F2 that is inset a distance R' from location F1 of the antenna 100 in FIG. 2A. R' may be less than ½ L such that location F2 is offset from the center C of the antenna 200 in the Azimuth direction. The length and width of the slots 253A and 253B may be used to control the impedance of the antenna 200. In some applications, antenna 200, by virtue of the slots 253A and 253B, together with the impedance stabilizing elements 206A and 206B, may serve to better stabilize the impedance of the antenna 200 (e.g., at 50 Ohms) over a wider frequency range relative to the antenna 100.

The feeding line may be a microstrip line as shown, a coplanar waveguide (CPW), a conductor-backed coplanar waveguide (CBCPW), other type of transmission line, or any combination of different types of transmission lines. In a currently preferred embodiment, and as discussed herein, the transmission line may be a conductor-backed coplanar waveguide. Feeding mechanisms that may be employed with the disclosed antenna having impedance stabilizing elements are discussed in more detail in FIGS. 6A-6C.

While FIGS. 2A-C and FIG. 3 respectively show an antenna 100 and 200 that are each fed by a solitary feed line 104 and 204, the artisan will understand that such is merely exemplary and that antennas employing the impedance control elements disclosed herein may employ multiple feed lines.

Figure 4A:
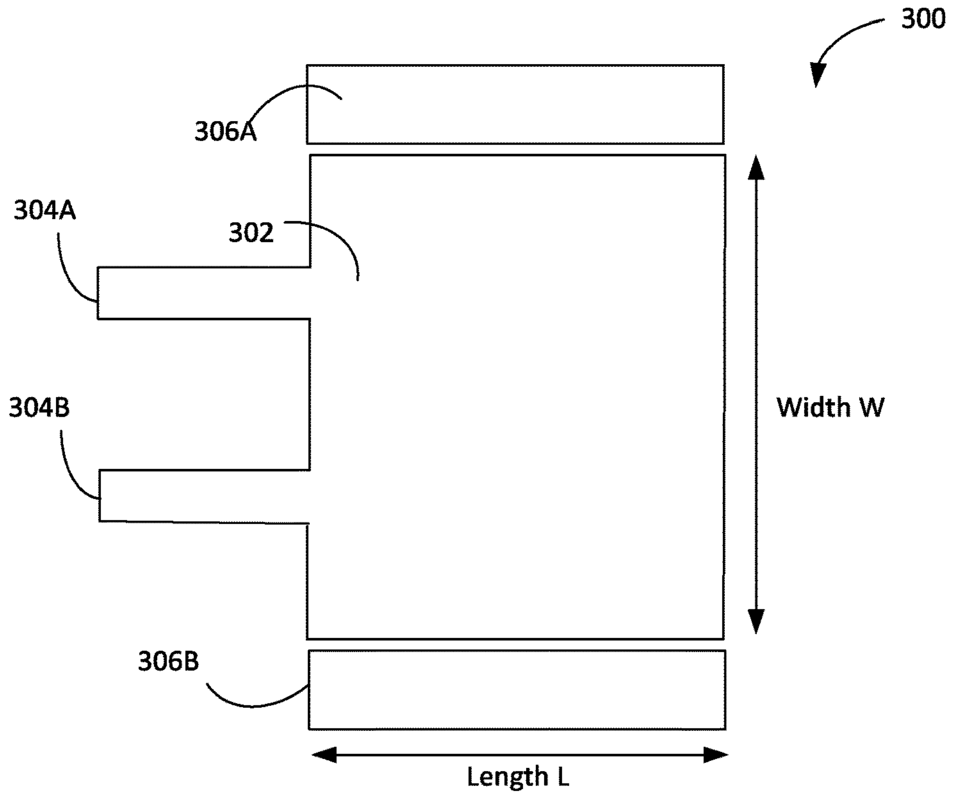
FIG. 4A is a top view of a wideband millimeter-wave microstrip patch antenna having two feed lines, according to an embodiment.

For example, FIG. 4A shows an alternate embodiment 300 of the antenna 100. Embodiment 300 is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, corresponding reference numbers may be used, though with any noted deviations.

Antenna 300, like the antenna 100, has a main patch 302 and impedance stabilizing elements 306A and 306B that are respectively disposed above and below the main patch 302 and are spaced apart therefrom. The primary difference between the antenna 100 and the antenna 300 is that the antenna 300, instead of the solitary transmission line 104, includes two transmission lines 304A and 304B on the same side of the main patch 302 that feed the signal to the main patch 302.

Figure 4B:
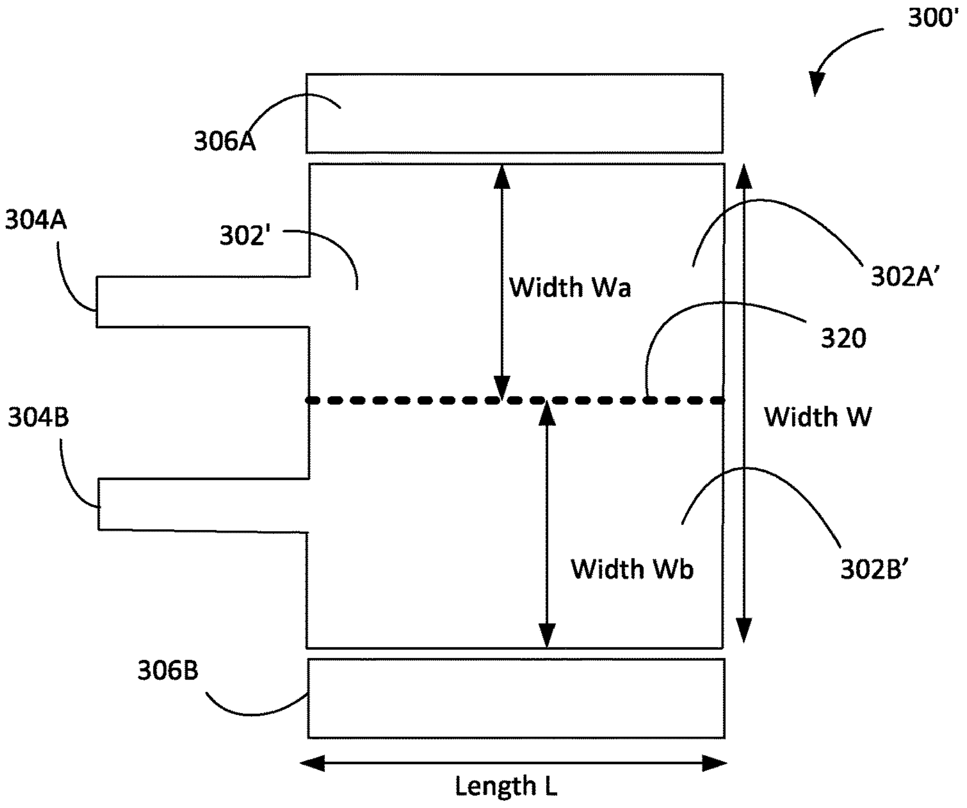
FIG. 4B is a top view of the wideband millimeter-wave microstrip patch antenna of FIG. 4A with a row of via, according to another embodiment.

FIG. 4B shows an alternate embodiment 300' of the antenna 300 that is substantially similar to the embodiment 300. Antenna 300', akin to antenna 300, comprises a main patch 302', feed lines 304A and 304B on the same side of the main patch 302', and impedance stabilizing elements 306A and 306B that are respectively disposed above and below the main patch 302' and are spaced apart from the main patch 302'. The primary difference between the antenna 300 and 300' is that the main patch 302' of the antenna 300' has a row of via 320 that extends laterally along the length L of the main patch 302' and divides the main patch into two segments 302A' and 302B'. As shown, a width of the segment 302A' is Wa and a width of the segment 302B' is Wb. These widths Wa and Wb may be the same, i.e., the row of via 320 may divide the main patch 302' into two equal segments. In other embodiments, the widths of the two segments 302A' and 302B' may be unequal. The row of via 320 may effectively alter the operational size of the antenna and allow for various parameters of the antenna to be readily controlled.

Figure 4C:
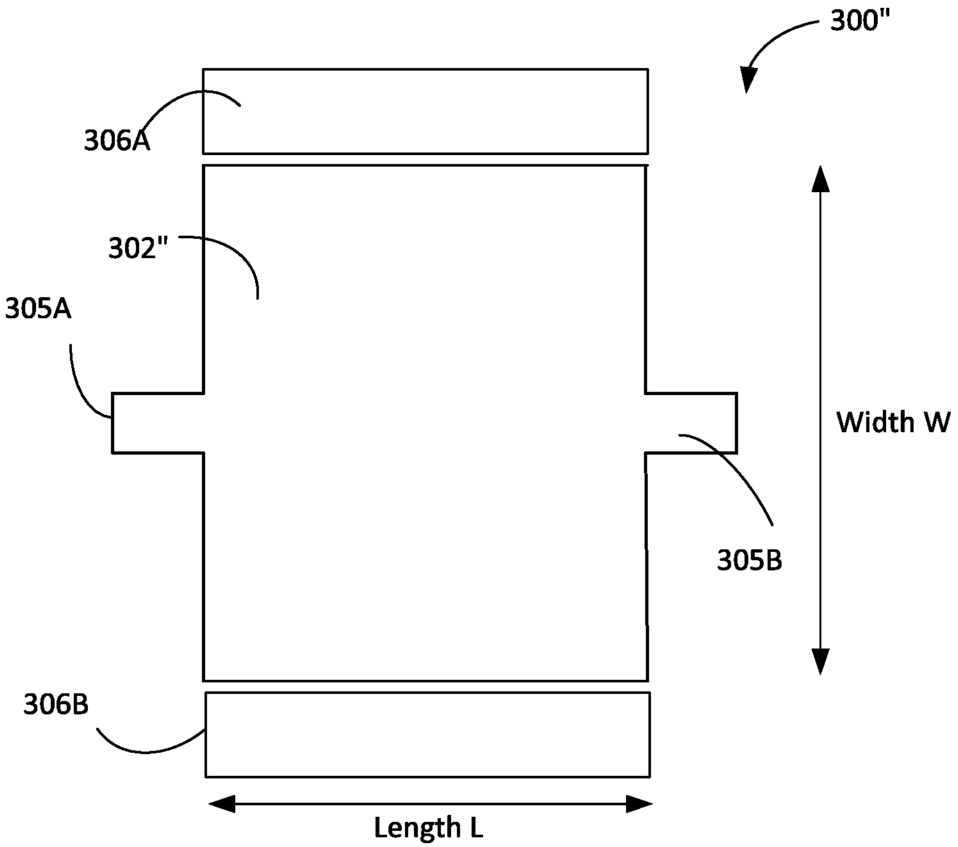
FIG. 4C is a top view of another wideband millimeter-wave microstrip patch antenna having two feed lines, according to an embodiment.

FIG. 4C shows an alternate embodiment 300" of the antenna 300. Antenna 300", like the antenna 300, has a main patch 302" and impedance stabilizing elements 306A and 306B that are respectively disposed above and below the main patch 302. The antenna 300" also has two feed lines 305A and 305B. However, unlike the antenna 300, the feed lines 305A and 305B may be disposed on opposing sides of the main patch 302". In embodiments, the feed line 305A may be configured to feed the signal to the main patch 302" and the feed line 305B may be configured to feed the signal from the main patch 302" (e.g., to another antenna or component on the board).

Figure 5A:
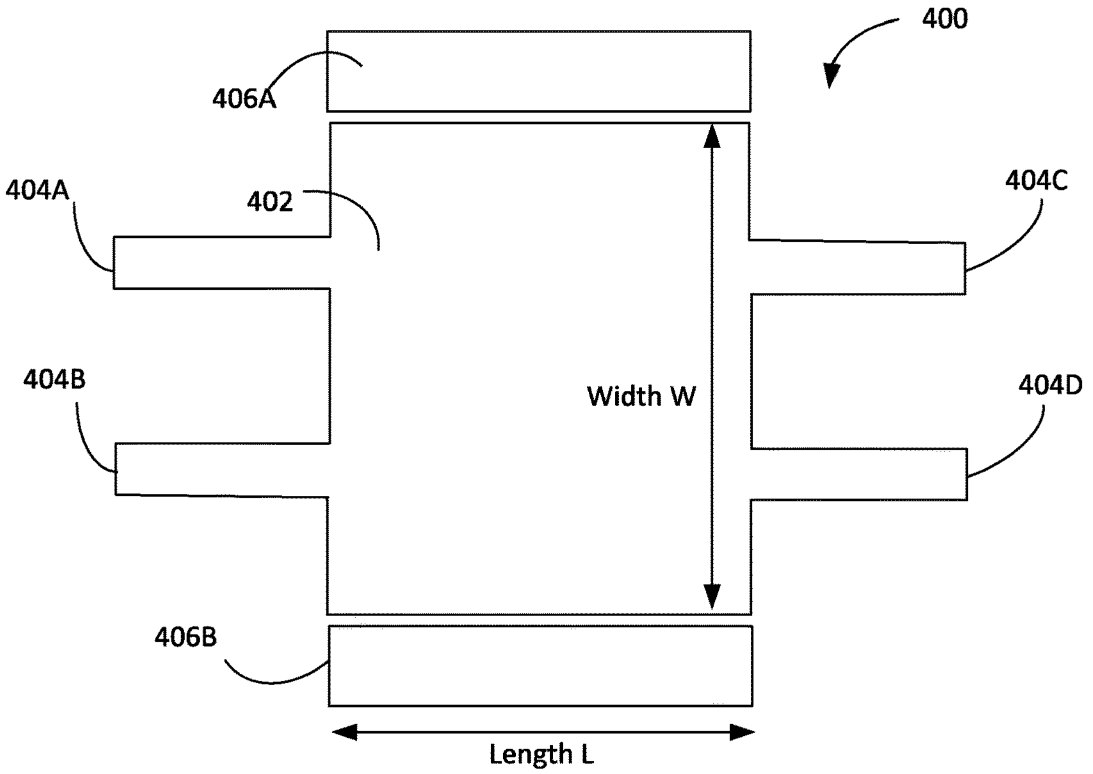
FIG. 5A is a top view of a wideband millimeter-wave microstrip patch antenna having four feed lines, according to an embodiment.

While FIGS. 4A-4C show implementations of the wideband microstrip antenna having two feed lines, such is merely exemplary, and the teachings of the disclosure are also applicable to antennas having any number and arrangement of feed lines. For example, FIG. 5A shows an alternate embodiment 400 of the antenna 300 that is substantially similar to the embodiment 300.

The antenna 400, like the antenna 300, may have a main patch 402 and impedance stabilizing elements 406A and 406B that are respectively disposed above and below the main patch 402 and are spaced apart therefrom. A primary difference between the antenna 300 and the antenna 400 may be that the antenna 300, unlike the antenna 300 with its two feeding lines 304A and 304B, may have four feeding lines 404A, 404B, 404C, and 404D. As can be seen, two feeding lines are disposed on one side of the main patch 402 and the other two feeding lines are disposed on the other side of the main patch 402. In embodiments, the feed lines 404A and 404B may be configured to feed the signal to the main patch 402 and the feed lines 404C and 404D may be configured to feed the signal from the main patch 402 (e.g., to another antenna or component on the board).

Figure 5B:
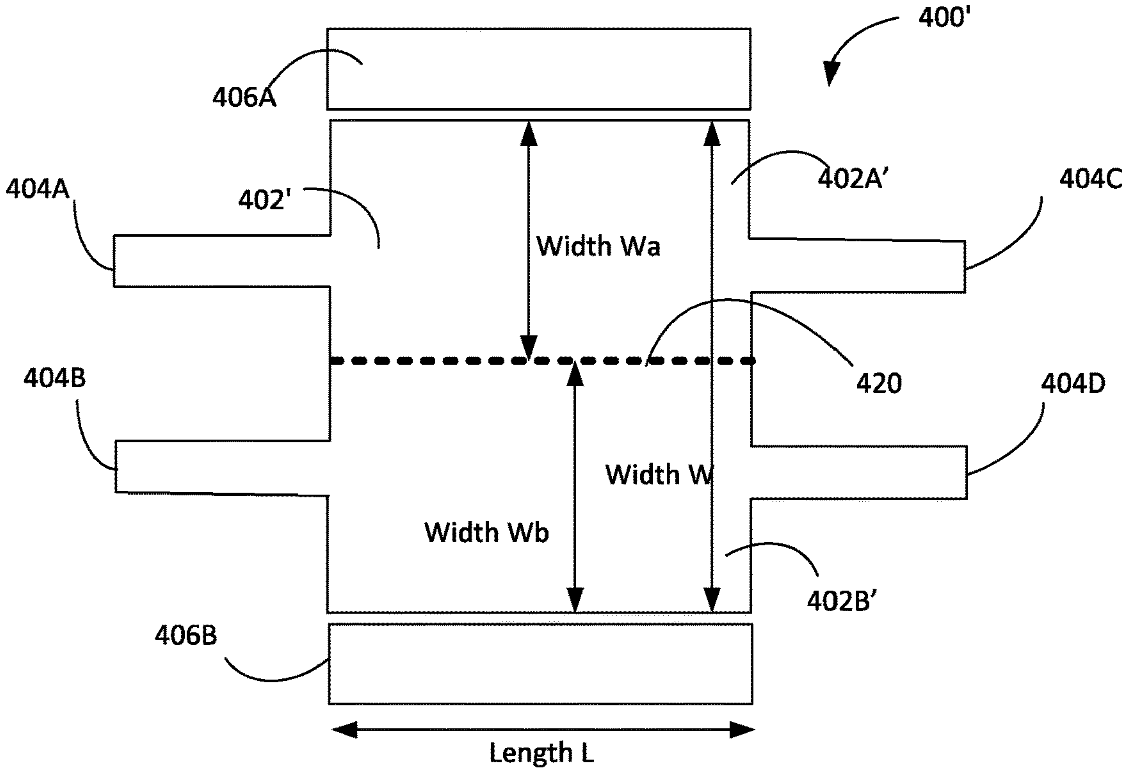
FIG. 5B is a top view of the wideband millimeter-wave microstrip patch antenna of FIG. 5A with a row of via, according to another embodiment.

FIG. 5B shows an alternate embodiment 400' of the antenna 400 and is substantially similar thereto. The antenna 400', like the antenna 400, may have a main patch 402'. The antenna 400' may likewise have impedance stabilizing elements 406A and 406B that are respectively disposed above and below the main patch 402' and are spaced apart therefrom. Further, like the antenna 400, the antenna 400' may have four feed ports 404A, 404B, 404C, and 404D, two of which may be disposed on one side of the main patch 402' and the other two of which may be disposed on the other side of the main patch 402'. The main difference between the antenna 400 and the antenna 400' is that the main patch 402' of the antenna 400' may have a row of via 420 that extends laterally along the length L of the main patch 402' and divides the main patch into two segments 402A' and 402B'. As shown, a width of the segment 402A' is Wa and a width of the segment 402B' is Wb. These widths Wa and Wb may be the same, i.e., the row of via 420 may divide the main patch 402' into two equal segments. In other embodiments, the widths of the two segments 402A' and 402B' may be disparate.

Thus, as has been described, the present disclosure provides for an EHF microstrip patch antenna having impedance stabilizing elements that are disposed above and below (or on either side of) the main patch at some distance away from the main patch. While the antennas 100, 200, 300, 300', 300", 400, and 400' are each illustrated in the FIGS. 2-5B as having a microstrip transmission line, such is merely exemplary. The artisan will understand each of these antennas 100, 200, 300, 300', 300", 400, and 400' may be fed using other means, such as a coplanar waveguide (CPW), a conductor-backed coplanar waveguide (CBCPW), microstrip transmission lines using differing substrate stack-ups, a substrate integrated waveguide (SIW), a stripline, a laminated waveguide, et cetera.

Figure 6A:
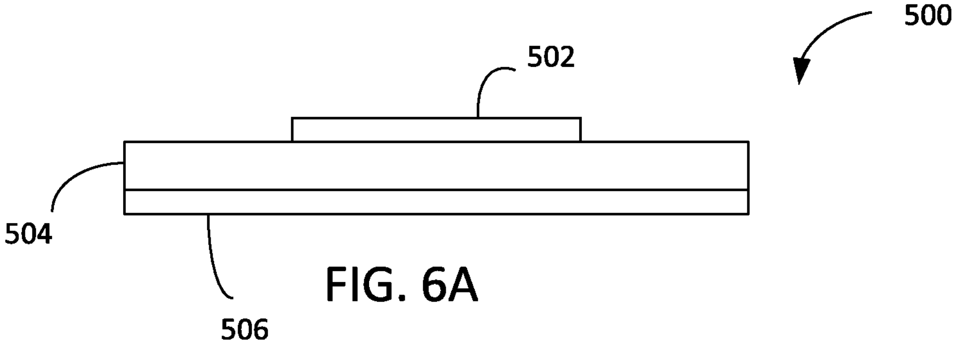
FIG. 6A is a cross-section side view of a microstrip feeding line for feeding the millimeter-wave wideband antennas of the present disclosure, in an embodiment.
Figure 6B:
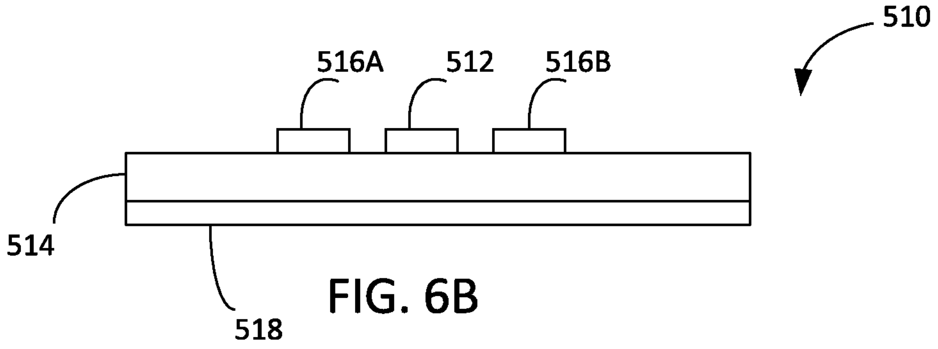
FIG. 6B is a cross-section side view of a coplanar wave guide (CPW) for feeding the millimeter-wave wideband antennas of the present disclosure, in an embodiment.
Figure 6C:
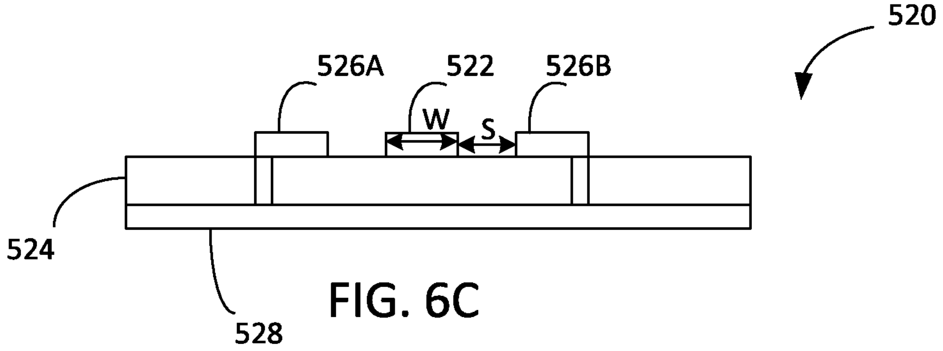
FIG. 6C is a cross-section side view of a conductor backed coplanar waveguide (CBCPW) for feeding the millimeter-wave wideband antennas of the present disclosure, in an embodiment.

Focus is directed now to FIG. 6A-6C, which show various transmission mechanisms usable with the antennas of the present disclosure. The transmission lines may include two metals: one metal used as ground and one for the signal. The ground may be a piece of metal layer, for example a microstrip line, may be a plurality of layers of metal electrically connected by vias like CBCPW, or may comprise multiple pieces of metal as in a CPW. The ground may also be embedded with other structures, for example, slots, split rings resonators (SRR), electromagnetic bandgaps (EBG), et cetera. Other types of transmission lines usable with the antennas disclosed herein may have only one metal, such as a waveguide or a substrate integrated waveguide (SIW).

As an example of a feeding mechanism, FIG. 6A shows a cross-section of a microstrip transmission line usable with the antennas 100, 200, 300, 300', 300", 400, and 400' discussed above. Specifically, the microstrip transmission line 500 comprises a microstrip feed line 502 formed atop a dielectric substrate 504. In this implementation, a ground 506, typically made of metal, is disposed below the dielectric substrate 504.

FIG. 6B shows another example feeding mechanism. Specifically, FIG. 6B shows a cross-section of a coplanar waveguide (CPW) 510 that may be employed to feed the signal to any of the antennas discussed above. The CPW 510 is a type of electrical planar transmission line which may be fabricated using printed circuit board technology. The CPW 510 may comprise a single conducting track 512 printed onto a dielectric substrate 514, together with a pair of return (or ground) conductors 516A and 516B, one on either side of the main track 512. As can be seen, all three conductors 512, 516A and 516B may be on the same side of the substrate 514, and hence may be coplanar. Each return conductor 516A and 516B may be separated from the central track 512 by a small gap, and each gap may have unvarying width along the length of the signal line 512. The CPW 510 may also have a separate ground 518 disposed below the substrate 514.

FIG. 6C shows yet another example feeding mechanism. Specifically, FIG. 6C illustrates a conductor backed coplanar waveguide (CBCPW) 520, which is a variation of the CPW 510. The conductor backed CPW 520 comprises a ground plane 528 on the bottom surface of a substrate 524. This ground plane 528 acts as a heat sink for circuits with active devices and may provide mechanical support. The CBCPW 520 may comprise a coplanar stripline 522 having a signal line of width w, and ground lines 526A and 526B may be disposed on opposing sides of the coplanar stripline 522. Each ground line 526A and 526B may be spaced apart from the stripline 522, i.e., may be at a distance S from the stripline 522. The characteristic impedance of the CBCPW 520 transmission line may be controlled by the gaps S and the signal line width W. The CBCPW 520 may in embodiments be preferable to the microstrip line 500 (FIG. 5A) because the CBCPW 520 may display relatively better dispersion characteristics. Specifically, signal leakage may be reduced by virtue of the conductors 526A and 526B with via connected to ground 528.

Figure 7A:
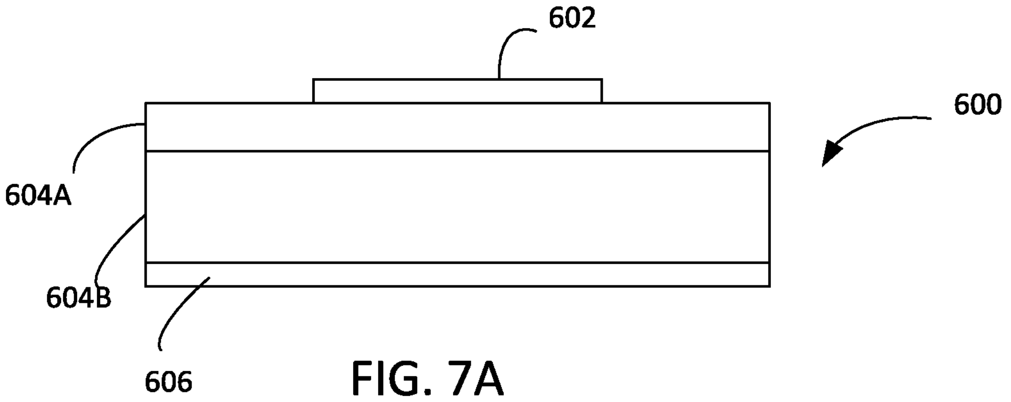
FIG. 7A is a cross-section side view of a multi-layered dielectric substrate usable in the millimeter-wave wideband antennas of the present disclosure, according to an embodiment.
Figure 7B:
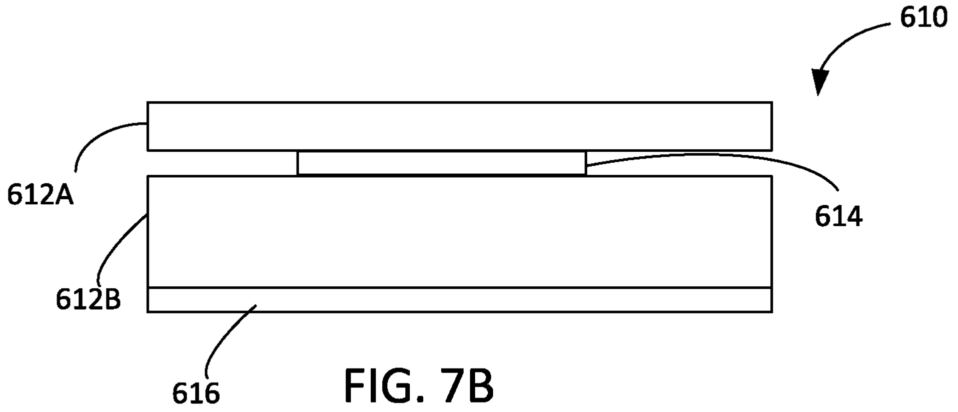
FIG. 7B is a cross-section side view of a multi-layered dielectric substrate having a microstrip line disposed between the layers, according an embodiment.
Figure 7C:
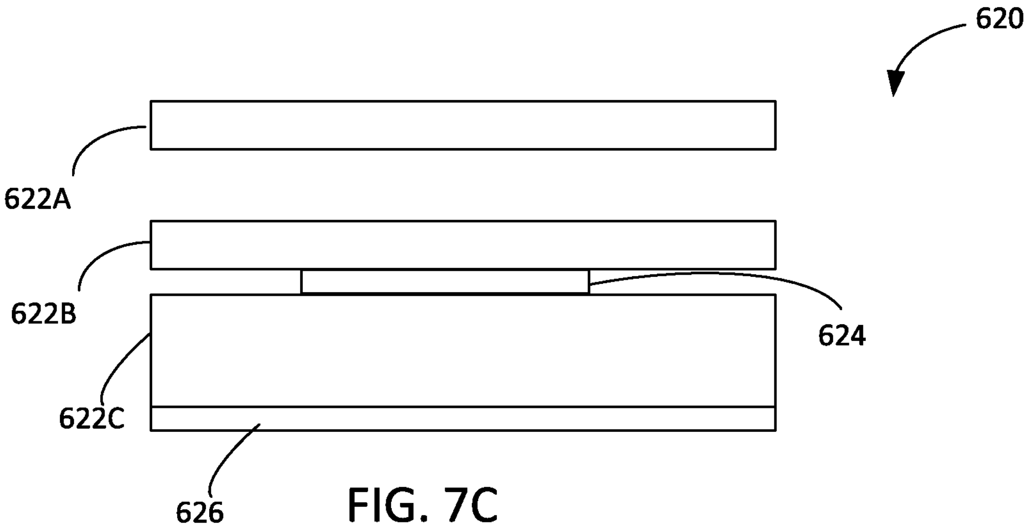
FIG. 7C is a cross-section side view of a multi-layered dielectric substrate having a layer suspended above the other layers, according to an embodiment.

FIGS. 7A-7C show various examples of dielectric substrates that may be employed with the antennas 100, 200, 300, 300', 300", 400, and 400' discussed above. The substrate may comprise homogeneous or inhomogeneous materials and may be rigid or flexible. The substrate may be configured to couple signals from one side to another side to fit different devices and application scenarios, for example, mobile devices, wearable devices, automotive sensor, et cetera. In embodiments, the dielectric substrate may comprise Rogers 3000 and 4000 series high frequency materials, RT/duroid, and/or other desirable materials.

The dielectric substrate usable with the antennas of the present disclosure may comprise a solitary layer. Alternately, as shown in FIG. 7A, a dielectric substrate 600 usable with the antennas disclosed herein may be multilayered, e.g., may comprise two layers 604A and 604B having different thicknesses. A ground plane 606 may be disposed below the substrate 600. An antenna 602 having impedance stabilizing elements and a transmission line may be disposed atop the substrate 600.

FIG. 7B shows a layered substrate 610 having layers 612A and 612B. The layered substrate 610 may have a microstrip line(s) 614 (e.g., an antenna having impedance stabilizing elements) disposed therebetween. A ground plane 616 may be provided underneath the bottom layer 612B of the substrate 610.

FIG. 7C shows another multi-layered substrate 620 having layers 622A, 622B, and 622C. A microstrip line(s) 624 is disposed between the layers 622B and 622C, and a ground plane 626 is formed underneath the bottom layer 622C. In this embodiment, one layer of the substrate, i.e., layer 622A, may be suspended above the other substrate layers 622B and 622C.

While the figures discussed above each show a solitary wideband millimeter-wave antenna (i.e., antennas 100, 200, 300, 300', 300", 400, and 400'), the artisan will understand these wideband antennas may be assembled in series or in parallel on the board, in various combinations. FIG. 8A-8H show various implementations of antenna assemblies comprising at least one of the antennas 100, 200, 300, 300', 300", 400, and 400'. The individual antennas of the various assemblies in FIGS. 8A-8H may be coupled to each other using any type of transmission line (e.g., a microstrip transmission line, a CPW, a CBCPW, et cetera). The various transmission lines used may be straight lines or meander lines.

The term "antenna assembly," as used herein, means a grouping of antennas that are electrically connected to each other in series, or in parallel via a divider or combiner. A grouping of proximate antennas that are not electrically connected in series, or in parallel via a divider or combiner, is distinguishable from an antenna assembly and is referred to herein as an "antenna array."

Figure 8A:
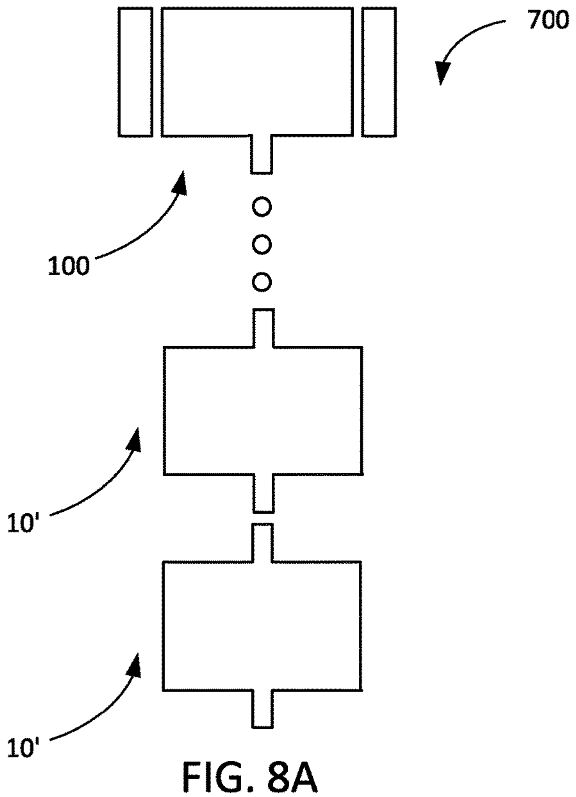
FIGS. 8A-8H are each top views of an antenna assembly comprising at least one millimeter-wave wideband antenna having impedance stabilizing elements.

FIG. 8A shows a linear antenna assembly 700. The assembly 700 may have a series of narrowband antennas 10' linearly coupled to each other. The antenna 10' may be a variant of the prior art antenna 10 (FIG. 1) but is different from antenna 10 in that antenna 10' may have two ports on opposing sides of the solitary patch. Wideband antenna 100 (FIGS. 2A-2C), with an impedance stabilizing element disposed on either side of its main patch, may form the terminal element of the assembly 700.

Figure 8B:
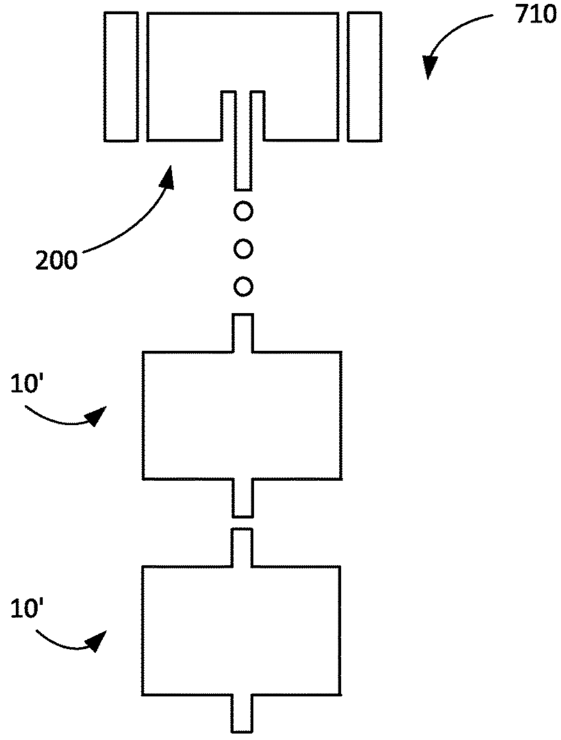

FIG. 8B shows another linear antenna assembly 710. The antenna assembly 710 may have a series of narrowband antennas 10' linearly coupled to each other, and the wideband antenna 200 (FIG. 3) may form the terminal element of the assembly 710.

Figure 8C:
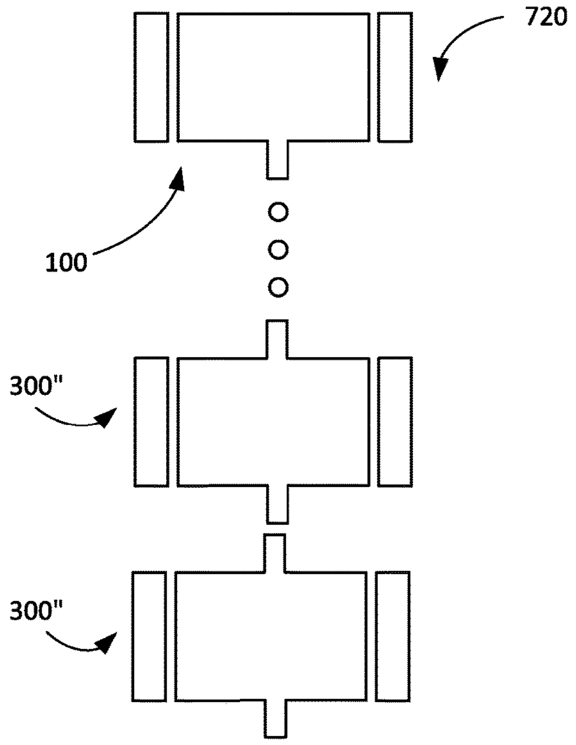

FIG. 8C shows a linear antenna assembly 720. The assembly 720 may comprise a plurality of wideband antennas 300" (FIG. 4C) linearly coupled to each other. The wideband antenna 100 (FIGS. 2A-2C) may form the terminal element of the assembly 720.

Figure 8D:
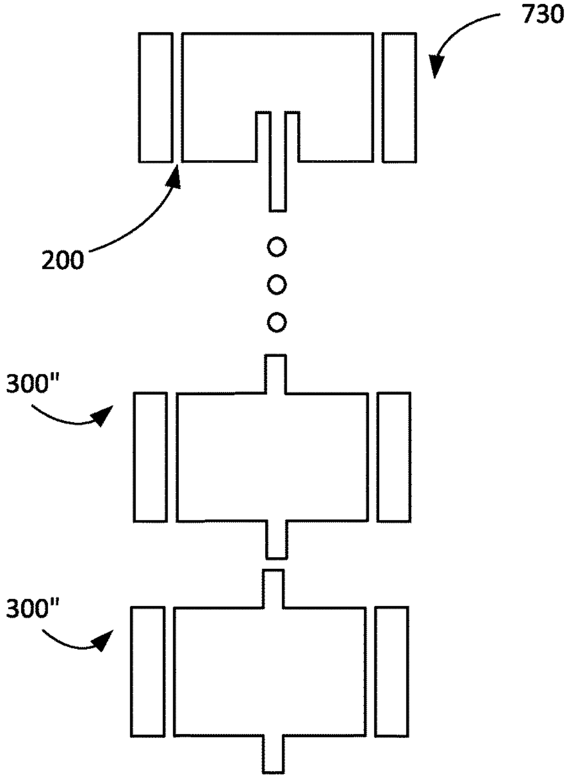

FIG. 8D shows a linear antenna assembly 730. The assembly 730 may comprise a plurality of wideband antennas 300" (FIG. 4C) linearly coupled to each other. The wideband antenna 200 (FIG. 3) may form the terminal element of the assembly 730.

Figure 8E:
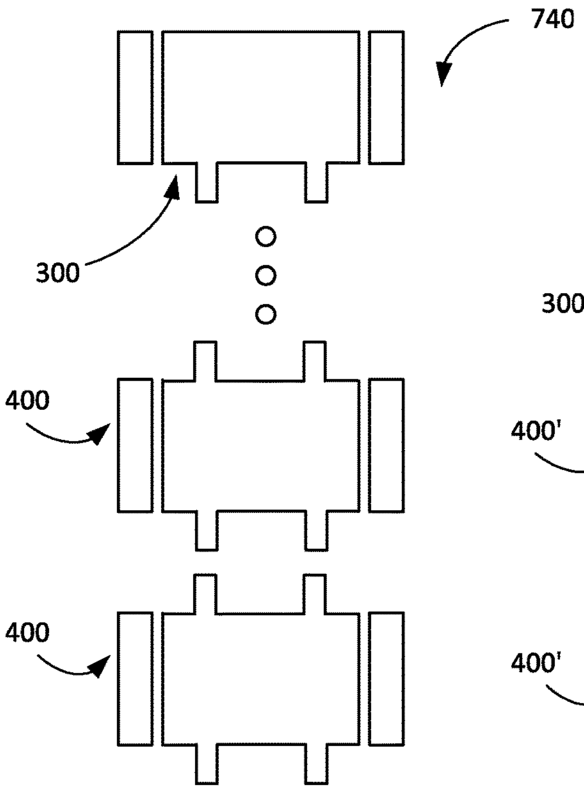

FIG. 8E shows another linear antenna assembly 740. The antenna assembly 740 may comprise a plurality of wideband antennas 400 (FIG. 5A) linearly coupled to each other, and the wideband antenna 300 (FIG. 4A) may form the terminal element of the assembly 740.

Figure 8F:
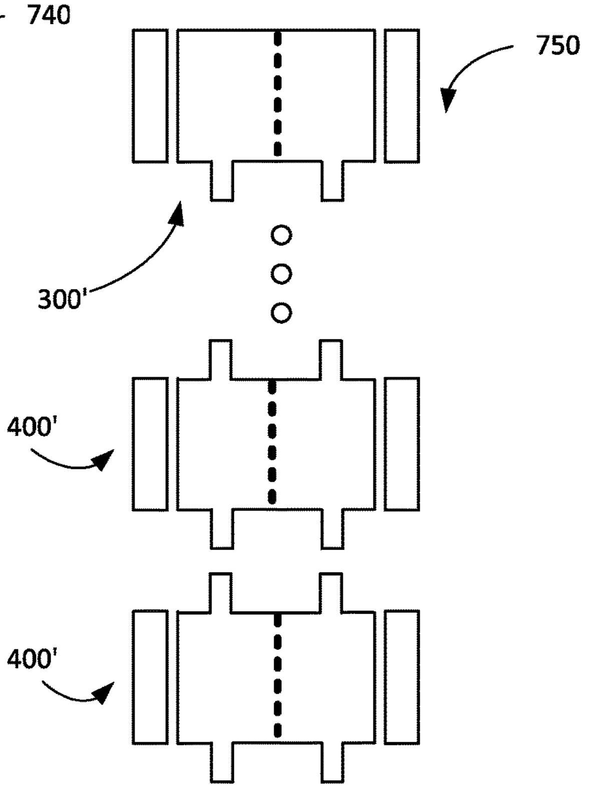

FIG. 8F illustrates yet another linear antenna assembly 750. The antenna assembly 750 may comprise a plurality of wideband antennas 400' (FIG. 5B) linearly coupled to each other, and the wideband antenna 300' (FIG. 4B) may form the terminal element of the assembly 750.

FIGS. 8A-8F all show linear assemblies of antennas coupled in series. FIGS. 8A-8B shows assemblies 700 and 710 wherein only the terminal antenna of the assembly is a wideband microstrip antenna (i.e., only the terminal antennas in the assemblies 700 and 710 includes impedance stabilizing elements). Conversely, FIGS. 8C-8F shows assemblies 720, 730, 740, and 750 that each include a plurality of wideband microstrip antennas (i.e., each of assemblies 720, 730, 740, and 750 includes a plurality of antennas each having impedance stabilizing elements).

The artisan will understand that impedance stabilizing elements (e.g., elements 106A, 106B of antenna 100, elements 206A, 206B of antenna 200, elements 306A, 306B of antenna 300, et cetera) may take up space on the board, and that a wideband antenna having impedance stabilizing elements may be costlier to manufacture as compared to an antenna that has a similarly sized main patch but is devoid of the impedance stabilizing elements. For example, fabrication of antenna 100 may be more intensive as compared to fabrication of Prior Art antenna 10, and the antenna 100 may take up more space on the board relative to a similarly sized antenna 10 without impedance control elements. Further, the parasitic impedance stabilizing elements of the wideband antenna (e.g., antenna 100) may make it more challenging to control the directional pattern of these wideband antenna, relative to, e.g., the Prior Art Antenna 10 that is devoid of these parasitic elements. Thus, the Prior Art antenna 10 may be easier to design and may have a more controllable radiation pattern. On the other hand, however, and as discussed herein, bandwidth of the prior art antennas devoid of the impedance stabilizing elements may be unduly narrow.

In view of these considerations, it may be beneficial in certain applications to employ antenna assemblies having only a solitary wideband antenna with impedance stabilizing elements, and further, it may be beneficial to employ the wideband antenna as the terminal antenna in the assembly (as opposed to the first antenna in the assembly). For example, and with reference to FIG. 8A, because a plurality of antennas 10' are coupled in series and the antenna 100 forms the terminal portion of the assembly 700, the antenna 100 may serve to stabilize the input impedance of all antennas 10' that are downstream the antenna 100 (i.e., the bandwidth of the entire assembly 700 may increase by virtue of the terminal antenna 100). However, concerns relating to additional costs of the wideband antennas may largely be avoided, relative to assemblies employing multiple wideband antennas coupled in series. Further, concerns regarding the controllability of the radiation pattern of the wideband antennas may be addressed by employing the wideband antenna as the terminal antenna in the assembly (as opposed to the first antenna in the assembly), because the terminal antenna of the assembly may receive the weakest signal by virtue of being the terminal antenna. Thus, in certain applications, assemblies 700 and 710 may be preferable to assemblies 720, 730, 740, and 750 or other assemblies wherein the wideband antenna does not form the terminal part of the assembly.

Figure 8G:
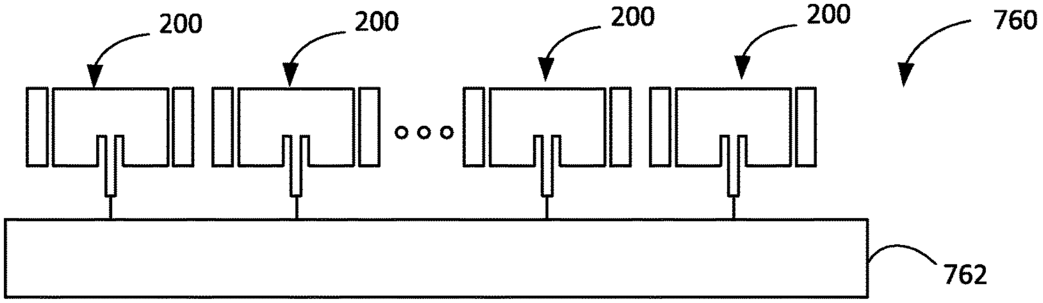
Figure 8H:
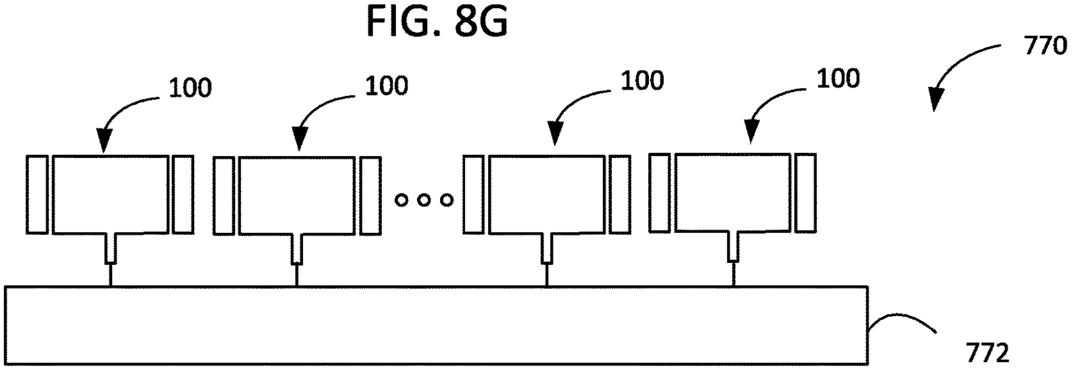

While FIGS. 8A-8F shows assemblies having antennas fed in series, the artisan will understand such is merely exemplary and that the wideband antennas may likewise be fed in parallel. FIG. 8G shows a parallel fed linear assembly 760 comprising a plurality of wideband antennas 200 coupled in parallel to a power divider or combiner 762. FIG. 8H shows another parallel fed linear assembly 770 comprising a plurality of wideband antennas 100 coupled in parallel to a power divider or combiner 772. The artisan will understand that the assemblies specifically shown in FIGS. 8A-8F are merely exemplary and that the wideband antennas with impedance stabilizing elements disclosed herein may be arranged in assemblies in numerous other configurations. Further, each assembly may include a number of different types of antennas (e.g., a plurality of different types of prior art antennas may be coupled together with any one or more of the wideband antennas disclosed herein), and depending on the application, the dimensions of the various antennas in the assembly may be configured to be equal or disparate.

Further, each antenna or antenna assembly may be arranged on the board in an array. For example, the PCB board may include a plurality of antennas (e.g., antennas 100, antenna 200, et cetera) and antenna assemblies (e.g., antenna assembly 700, antenna assembly 710, et cetera) arranged in an array, and each component of the array may be fed independently (e.g., may be fed a different signal). Alternately, and depending on the application, two or more components of the array may be fed the same signal. The arrangement of the array may be chosen based on the application. FIGS. 9A-9H show a non-exhaustive grouping of arrays in which the wideband antennas and arrays comprising wideband antennas may be arranged.

Figure 9A:
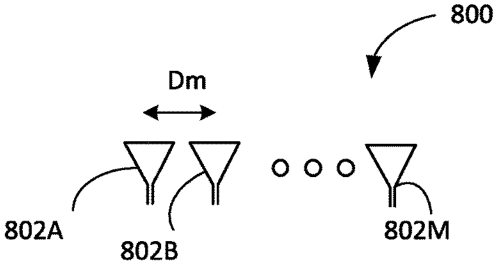
FIGS. 9A-9H are each schematic illustrations of antenna arrays comprising at least one of a millimeter-wave wideband antenna and an antenna assembly comprising a millimeter-wave wideband antenna.

Specifically, FIG. 9A shows an array 800 having M components, i.e., components 802A, 802B . . . , and 802M. As can be seen, the array 800 is a linear horizontal array, and may be so arranged on a circuit board. Each component of the array 800 (e.g., component 802A, 802B, 802M, et cetera) may be an antenna or an antenna assembly. At least one component of the array 800 may be a wideband antenna as disclosed herein or an antenna assembly comprising at least one wideband antenna. For example, component 802A may be the wideband antenna 100 (FIGS. 2A-2C), component 802B may be the Prior Art antenna 10 (FIG. 1A), and component 802M may be the antenna assembly 700 (FIG. 8A). Or, for instance, each of components 802A, 802B, and 802M may comprise antenna assembly 710 (FIG. 8B). The horizontal distance between each adjacent component of the array 800 may be the same and is illustrated in FIG. 9A as distance Dm.

Figure 9B:
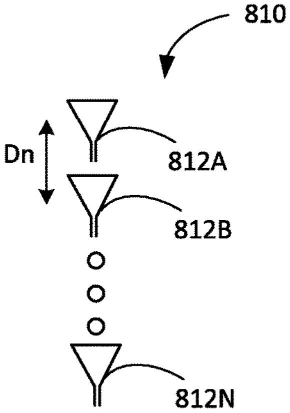

FIG. 9B shows a linear vertical array 810 having N components, i.e., components 812A, 812B . . . , and 812N. Each component of the array 810 may be an antenna or an antenna assembly, and at least one component of the array 810 may be a wideband antenna or an antenna assembly comprising a wideband antenna as disclosed herein. For example, component 812A and 812B may each be the wideband antenna 100 (FIGS. 2A-2C), and component 802N may be the antenna assembly 710 (FIG. 8B). The vertical distance between each adjacent component of the array 810 may be the same and is illustrated in FIG. 9B as distance Dn.

Figure 9C:
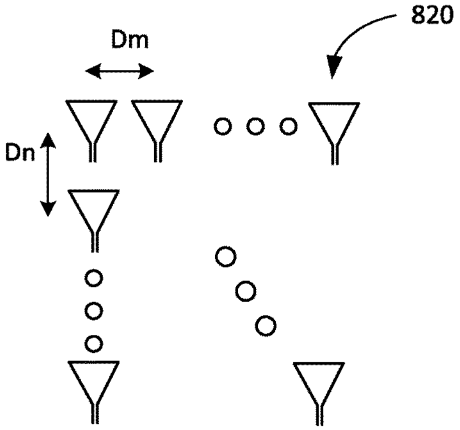

FIG. 9C shows an M×N component array 820. As in arrays 800 and 810, each component of the array 820 may be an antenna or an antenna assembly, and at least one component of the array 820 may comprise a wideband antenna or an antenna assembly comprising a wideband antenna. The horizontal distance between adjacent components may be equal and is denoted in FIG. 9C as distance Dm. The vertical distance between adjacent components may likewise be equal and is denoted in FIG. 9C as distance Dn. Depending on the application, Dm may be greater than, equal to, or less than the distance Dn. Further, the values of M and N may but need not be the same.

Figure 9D:
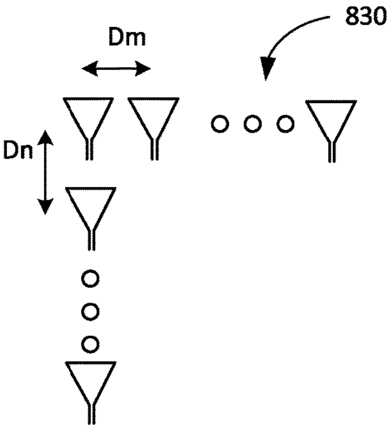

FIG. 9D shows another array 830 that includes a linear vertical array and a linear horizontal array. The horizontal distance Dm between two adjacent components may be the same. Similarly, the vertical distance Dn between two adjacent components may be the same.

Figure 9E:
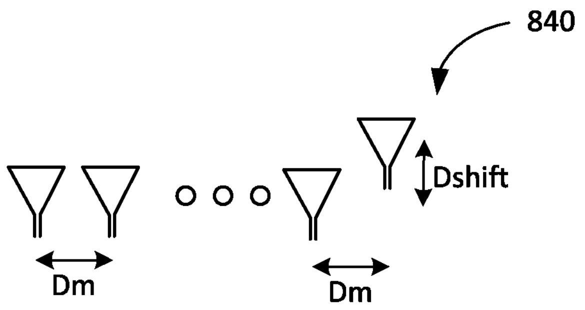
Figure 9F:
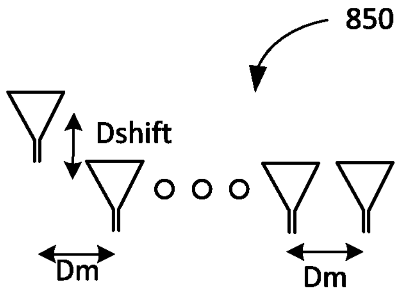

FIGS. 9E-9F show arrays 840 and 850, respectively. The arrays 840 and 850 may be linear arrays, except that the last component and the first component of the arrays 840 and 850 respectively may be shifted upward relative to the other components by a distance Dshift. The horizontal distance Dm between adjacent components in arrays 840 and 850 may be the same.

Figure 9G:
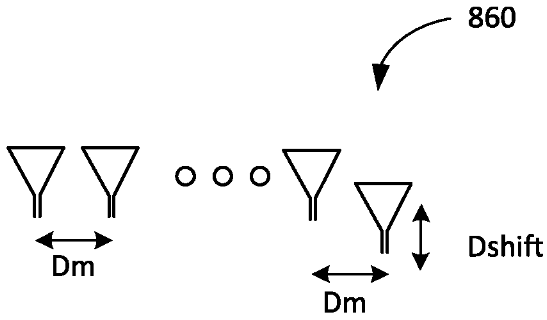
Figure 9H:
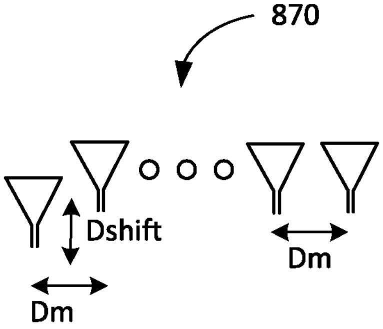

FIGS. 9G-9H depict arrays 860 and 870, respectively. The arrays 860 and 870 may be linear arrays, except that the last component and the first component of the arrays 860 and 870 respectively may be shifted downward relative to the other components by a distance Dshift. The horizontal distance Dm between adjacent components in arrays 860 and 870 may be the same.

Each component of the arrays in FIGS. 9E-9H may be a wideband antenna or an antenna assembly comprising a wideband antenna. The arrays 800, 810, 820, 830, 840, 850, 860, and 870 may be particularly suited for multi-input multi-output (MIMO) radar. However, the artisan will appreciate the arrays may also be desirably used in other applications. Dm and Dn may be selected in line with the requirements of the specific application. Typically, Dm and/or Dn may be about half of the free space wavelength (2) at operational frequency. Alternately, Dm and/or Dn may be an integer multiple of the free space wavelength. The dimensions (e.g., widths) of the various patches of the components may be disparate and may be chosen to obtain desired antenna performance (e.g., obtain a specific antenna gain, radiation pattern, sidelobe levels, et cetera). In some embodiments, an antenna array as disclosed herein may be used as a dummy array (i.e., no signal may be fed to the array to save space).

Figure 10A:
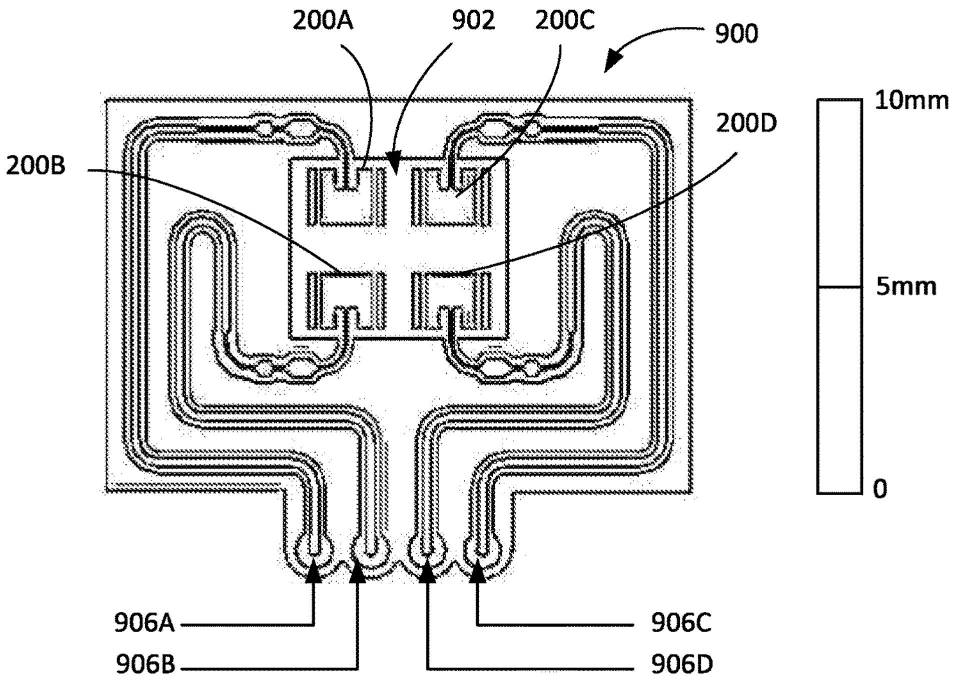
FIG. 10A is a schematic illustration of a millimeter-wave antenna array comprising wideband antennas with impedance stabilizing elements on a printed circuit board.
Figure 10B:
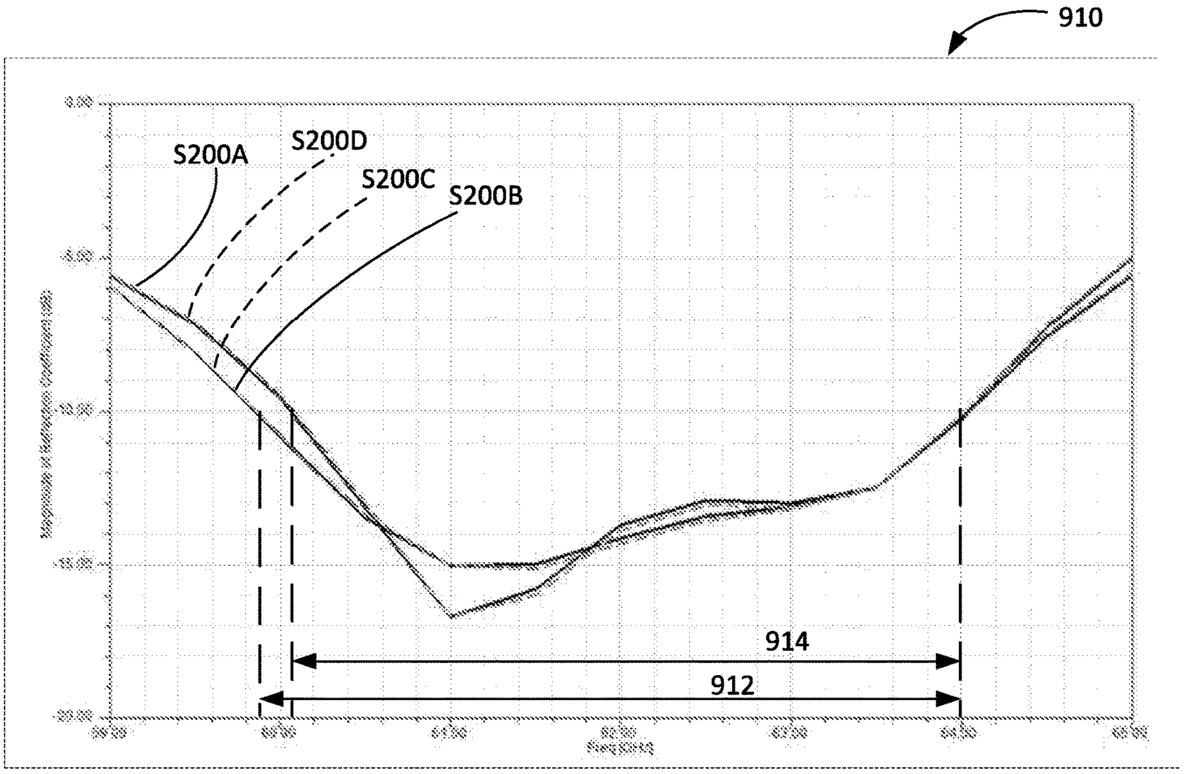
FIG. 10B is a simulation plot illustrating a magnitude of reflection coefficient of the antennas in the antenna array of FIG. 10A.

FIGS. 10A-10B illustrate performance improvements of the wideband millimeter-wave antennas disclosed herein over the prior art antenna.

Specifically, FIG. 10A shows a circuit board 900 on which an antenna array 902 is fabricated. The antenna array 902 is an M×N array of the type shown in FIG. 9C, where M=N=2. In this example, the array 902 has components 200A, 200B, 200C, and 200D. Each of these components 200A-200D includes a solitary wideband antenna 200 of the type shown in FIG. 3. As can be seen, each antenna 200A-200D includes a main patch and two impedance stabilizing elements that are spaced apart from the main patch and extend on opposing sides of the main patch. A separate signal is coupled to each antenna 200A, 200B, 200C, and 200D via conductor backed coplanar waveguides 906A, 906B, 906C, and 906D, respectively. The conductor backed coplanar waveguides 906A-906D are of the type shown in FIG. 6C. The substrate used in FIG. 6 is a RO3003 with thickness of 5 mil.

FIG. 10B shows a simulation plot 910 of the return loss S of the antennas 200A, 200B, 200C, and 200D. As can be seen, antennas 200B and 200C have a 10 dB return loss bandwidth 912 of about 4.2 GHz. Similarly, antennas 200A and 200D have a 10 dB return loss bandwidth 914 of about 4 GHz. Thus, the impedance stabilizing elements (i.e., elements 206A and 206B in FIG. 2) serve to more than double the bandwidth of the antenna 200 relative to the antenna 10 whose return loss plot is shown in FIG. 1C. That is, the impedance stabilizing elements of the EFH wideband antennas 200A-200D serve to stabilize the impedance of the antennas at the target impedance from about 60 GHz to 64 GHz (as compared to from 61.5 GHz to 63 GHz, see FIG. 1C) and therefore result in a marked improvement over the narrowband patch antennas of the prior art. A bandwidth of "about 4 GHz", as used herein, means a bandwidth greater than 3.5 GHz and less than 5 GHz. In embodiments, the antennas disclosed herein may have an operational frequency between 60-64 GHz. In other embodiments, the antennas may have an operational frequency up to 80 GHz.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A millimeter-wave wideband patch antenna comprising:

a rectangular main patch and two rectangular impedance stabilizing elements each located at a distance from the main patch, one of the two rectangular impedance stabilizing elements disposed at a first side of the main patch and the other of the two rectangular impedance stabilizing elements disposed at a second side of the main patch opposing the first side, wherein the two impedance stabilizing elements serve to stabilize an impedance of the main patch, a length of each of the two rectangular impedance stabilizing elements being equal to a length of the main patch, and a width of each of the two rectangular impedance stabilizing elements being less than half of a width of the main patch, the main patch comprising:

a plurality of feed lines, each of the plurality of feed lines extending from at least one of a third side of the main patch and a fourth side of the main patch opposing the third side, and a row of via on the main patch extending parallel to at least one of the first side and the second side.

2. The millimeter-wave wideband patch antenna of claim 1, wherein the plurality of feed lines includes at least one feed line extending from the third side of the main patch and at least one feed line extending from the fourth side of the main patch.

3. The millimeter-wave wideband patch antenna of claim 1, wherein the plurality of feed lines includes at least two feed lines each extending from the third side of the main patch.

4. The millimeter-wave wideband patch antenna of claim 1, wherein at least one of the plurality of feed lines includes a slot in the main patch on both sides of the at least one feed line.

5. The millimeter-wave wideband patch antenna of claim 1, configured in an array of antennas.

6. The millimeter-wave wideband patch antenna of claim 5, wherein the millimeter-wave wideband patch antenna is a terminal portion of the array of antennas.

7. The millimeter-wave wideband patch antenna of claim 1, wherein at least a portion of the antenna is formed on a multilayered substrate.

8. The millimeter-wave wideband patch antenna of claim 1, wherein the row of via divides the main patch into two segments.

9. The millimeter-wave wideband patch antenna of claim 8, wherein the two segments are equal in size.

10. The millimeter-wave wideband patch antenna of claim 1, wherein the distance is about 0.1 mm.

11. The millimeter-wave wideband patch antenna of claim 1, wherein the distance is about 0.05 mm.

12. A millimeter-wave wideband patch antenna comprising:

a rectangular main patch and two rectangular impedance stabilizing elements each located at a distance from the main patch, one of the two rectangular impedance stabilizing elements disposed at a first side of the main patch and the other of the two rectangular impedance stabilizing elements disposed at a second side of the main patch opposing said first side, wherein the two impedance stabilizing elements serve to stabilize an impedance of the main patch, a length of each of the two rectangular impedance stabilizing elements being equal to a length of the main patch, and a width of each of the two rectangular impedance stabilizing elements being less than half of a width of the main patch, the main patch comprising:

at least one feed line extending from at least one of a third side and a fourth side of the main patch, and a row of via extending parallel to at least one of the first side and the second side.

13. The millimeter-wave wideband patch antenna of claim 12, wherein the feed lines comprises a plurality of feed lines that includes at least one feed line extending from the third side of the main patch and at least one feed line extending from the fourth side of the main patch.

14. The millimeter-wave wideband patch antenna of claim 12, wherein the main patch comprises two slots, one of the two slots on one side of the at least one feed line and the other of the two slots on the other side of the main patch.

15. The millimeter-wave wideband patch antenna of claim 12, wherein the row of via divides the main patch into two equal segments.

16. The millimeter-wave wideband patch antenna of claim 12, wherein the millimeter-wave wideband patch antenna is a part of an antenna array.

17. The millimeter-wave wideband patch antenna of claim 16, wherein the millimeter-wave wideband patch antenna is a terminal part of the antenna array.

18. A millimeter-wave wideband patch antenna comprising:

a main patch and two impedance stabilizing elements each located at a distance from the main patch, one of the two impedance stabilizing elements disposed at a first side of the main patch and the other of the two impedance stabilizing elements disposed at a second side of the main patch opposing the first side, wherein the two impedance stabilizing elements serve to stabilize an impedance of the main patch, a length of each of the impedance stabilizing elements being equal to a length of the main patch;

a maximum width of each of the two impedance stabilizing elements being less than half of a maximum width of the main patch, the main patch comprising at least one feed line extending from at least one of a third side and a fourth side of the main patch and a row of via extending parallel to at least one of the first side and the second side.

19. The millimeter-wave wideband patch antenna of claim 18, wherein the millimeter-wave wideband patch antenna is a terminal portion of an antenna array.

20. The millimeter-wave wideband patch antenna of claim 18, wherein the main patch includes two slots, one at a first side of the at least one feed line and the other at an opposing side of the at least one feed line.

* * * * *